United States Patent
Patnaik et al.

(10) Patent No.: US 10,685,047 B1
(45) Date of Patent: Jun. 16, 2020

(54) REQUEST PROCESSING SYSTEM

(71) Applicant: TOWNSEND STREET LABS, INC., San Francisco, CA (US)

(72) Inventors: Pratyus Patnaik, Los Altos, CA (US); Marissa Mary Montgomery, San Francisco, CA (US); Jay Srinivasan, San Francisco, CA (US); Suchit Agarwal, San Francisco, CA (US); Rajhans Samdani, San Francisco, CA (US); David Colby Kaneda, San Francisco, CA (US); Nathaniel Ackerman Rook, San Francisco, CA (US)

(73) Assignee: TOWNSEND STREET LABS, INC., San Francisco, CA (US)

( * ) Notice: Subject to any disclaimer, the term of this patent is extended or adjusted under 35 U.S.C. 154(b) by 618 days.

(21) Appl. No.: 15/373,312

(22) Filed: Dec. 8, 2016

(51) Int. Cl.
  *G06F 16/332* (2019.01)
  *G06F 16/33* (2019.01)
  *G06F 21/60* (2013.01)
  *G06F 21/62* (2013.01)

(52) U.S. Cl.
  CPC ........ *G06F 16/3325* (2019.01); *G06F 16/334* (2019.01); *G06F 16/3326* (2019.01); *G06F 21/604* (2013.01); *G06F 21/6227* (2013.01)

(58) Field of Classification Search
  CPC ............... G06F 16/3326; G06F 16/334; G06F 16/3325; G06F 16/3329; G06F 16/3344; G06F 16/90332; G06F 16/00; G06F 16/242; G06F 16/243; G06F 16/248; G06F 16/313; G06F 16/9038; G06F 17/27; G06F 17/2785; G06F 17/277; G06F 21/604; G06F 21/6227; G06N 5/022; G06N 20/00; G06N 5/02; Y10S 707/99935; Y10S 707/99933; G10L 15/18; G10L 15/1815; G10L 15/1822; G10L 15/183
  USPC .............. 707/748, 749, 769; 434/322; 704/9
  See application file for complete search history.

(56) References Cited

U.S. PATENT DOCUMENTS

| | | | | |
|---|---|---|---|---|
| 6,026,388 A | * | 2/2000 | Liddy | G06F 16/3329 |
| 2004/0243568 A1 | * | 12/2004 | Wang | G06F 16/313 |
| 2005/0086046 A1 | * | 4/2005 | Bennett | G06F 17/27 704/2 |
| 2010/0076998 A1 | * | 3/2010 | Podgorny | G06Q 10/10 707/772 |
| 2012/0078890 A1 | * | 3/2012 | Fan | G09B 7/00 707/723 |

(Continued)

*Primary Examiner* — Dennis Truong
(74) *Attorney, Agent, or Firm* — Lindauer Law, PLLC

(57) ABSTRACT

A system for processing queries from a user device may first generate an augmented query by determining weight values and synonyms for at least a portion of the parameters in the query, and adding or removing one or more query parameters. Correspondence between the augmented query and an existing set of data entries may be used to determine a subset of data entries that may be responsive to the query. Correspondence may then be determined between the augmented query and previous queries that were addressed by the subset of data entries, to determine a particular previous query having the greatest correspondence with the augmented query. The data entry associated with the particular previous query may be used to generate a response to the query received from the user device.

20 Claims, 9 Drawing Sheets

(56) References Cited

U.S. PATENT DOCUMENTS

| | | | |
|---|---|---|---|
| 2013/0007037 A1* | 1/2013 | Azzam | G06F 16/3329 |
| | | | 707/769 |
| 2013/0212096 A1* | 8/2013 | Ben Shahar | G06F 16/319 |
| | | | 707/730 |
| 2014/0040181 A1* | 2/2014 | Kuznetsov | G06F 17/2755 |
| | | | 706/55 |
| 2014/0149411 A1* | 5/2014 | Anand | G06F 16/3329 |
| | | | 707/737 |
| 2014/0172882 A1* | 6/2014 | Clark | G06N 5/022 |
| | | | 707/749 |
| 2015/0172294 A1* | 6/2015 | Bittner | G06F 16/00 |
| | | | 726/4 |
| 2016/0171373 A1* | 6/2016 | Allen | G06F 16/907 |
| | | | 706/50 |
| 2016/0180726 A1* | 6/2016 | Ahuja | G06N 5/022 |
| | | | 434/322 |
| 2016/0335554 A1* | 11/2016 | Koll | G09B 7/02 |
| 2017/0228372 A1* | 8/2017 | Moreno | G06F 16/24522 |
| 2017/0242899 A1* | 8/2017 | Jolley | G06F 3/0482 |
| 2017/0243107 A1* | 8/2017 | Jolley | G06N 3/006 |
| 2018/0144064 A1* | 5/2018 | Krasadakis | G10L 13/00 |
| 2018/0212904 A1* | 7/2018 | Smullen | H04L 51/02 |
| 2018/0227190 A1* | 8/2018 | Healing | H04L 41/142 |

\* cited by examiner

REQUEST PROCESSING SYSTEM

BACKGROUND

Individuals within companies or other organizations may submit requests for information or services. The requests may be processed by a variety of systems.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
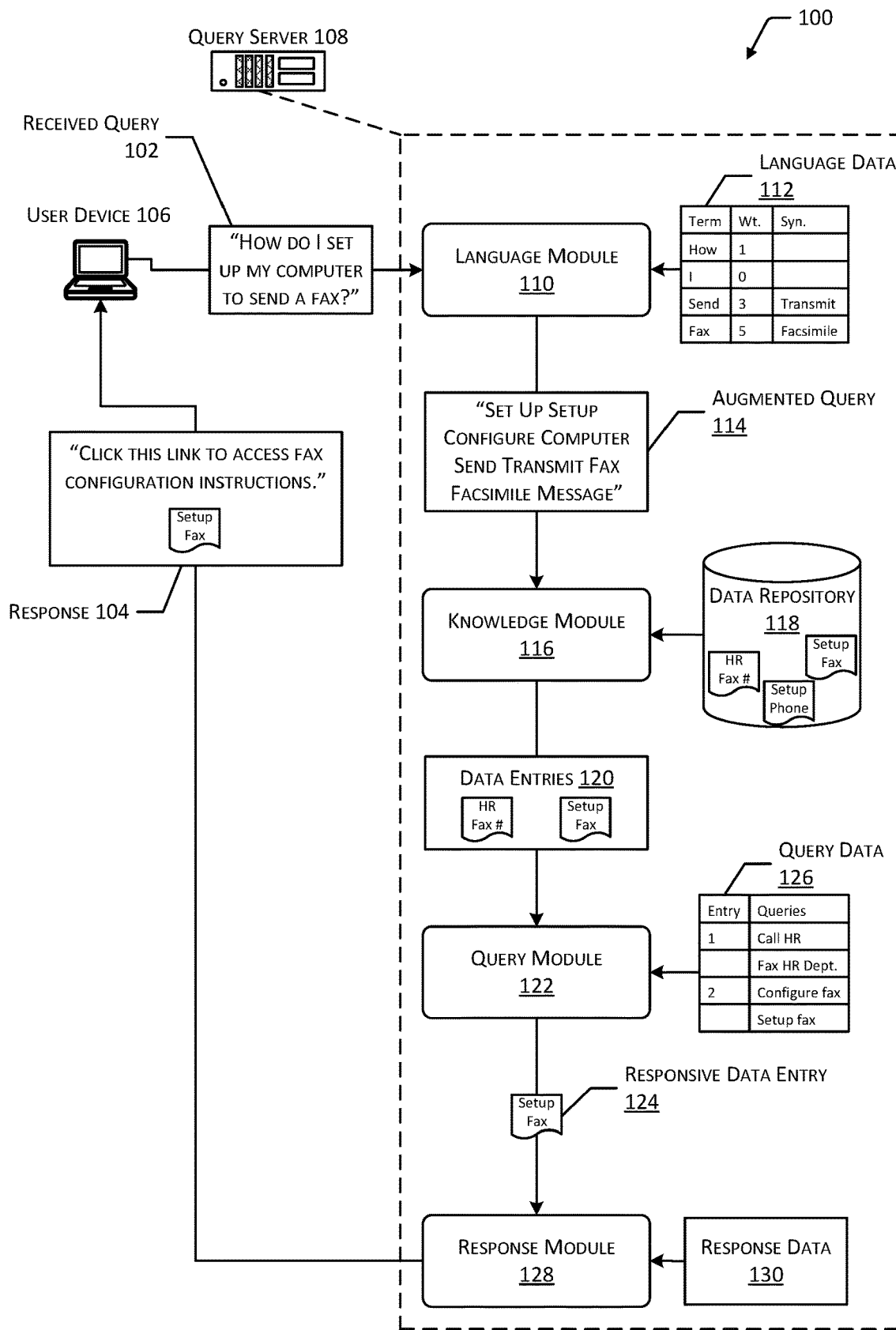
FIG. 1 depicts a system for processing a received query to generate a response.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Companies and other organizations may process requests for information or services from a user through various types of partially-automated systems, such as ticketing systems, or by manually processing requests. For example, an employee of a company may electronically submit a query, such as "What is the fax number for the human resources department?", "How do I set up my computer to send faxes?", or "How do I enroll in the company benefits program?". In some cases, the employee may transmit the query, such as through e-mail or a messaging program, to a department or a particular individual associated with the company. In other cases, the employee may transmit the query through a web portal or messaging system to an employee or group of employees responsible for routing messages to appropriate departments or individuals that may address the query. In still other cases, the employee transmitting the request may select or specify a department or individual to receive the request. Periodically, a company may review the queries that were resolved during a period of time and create articles or other sources of knowledge that may be used to answer subsequent queries of a similar nature. For example, if a company receives numerous questions within a month regarding the process for enrolling employees in a benefits program, an individual within the company may generate a web page, article, or other type of data entry that explains this process. During the next month, subsequent queries relating to enrollment in a benefits program may be resolved by directing the employee providing the subsequent query to the existing data entry.

In some cases, queries from a user may be inadvertently directed toward an employee or department that is unable to resolve the query, either by the user submitting the query, other users responsible for routing the query, or an automated system. In other cases, similarities between a current query and one or more previous queries may not be readily apparent, depending on the particular language, grammar, or format of the query. In still other cases, a particular data entry may appear relevant to a received query, such as due to common keywords present in both the data entry and the query, but the data entry may not actually address the question presented by the user.

Described in this disclosure are techniques for analyzing a query received from a user and generating a response. The query may be received through a messaging system, short message service (SMS), e-mail, a web portal, and so forth. An augmented query may be generated using the received query, such as through use of natural language processing techniques. In some implementations, language data indicative of particular weights applied to certain terms of the query and synonyms of particular query terms may be used to process the received query. For example, a user query may include the text "What is the fax number for the human resources department?". The language data may indicate that certain terms, such as "what", "is", "the", and "for" are unimportant for resolving the query, and thus have a weight of zero. The language data may indicate a high weight value for the terms "fax", "human", and "resources", and a moderate weight value for the terms "number" and "department". Additionally, the language data may indicate synonyms for one or more terms in the query. For example, the language data may indicate that synonyms for the term "fax" may include "facsimile", "scanner", "copier", and so forth. Similarly, the language data may indicate the synonyms "HR" and "H.R." for the terms "human resources". Continuing the example, the received query may be processed to generate an augmented query, such as "fax facsimile scanner copier number human resources HR H.R. department".

To determine an appropriate response to the query, the augmented query may be compared with an existing set of data entries, a set of previously received queries, or both. For example, in some cases, the time or computing resources needed to compare the augmented query with previously received queries within a system may be greater than the time or computing resources needed to compare the augmented query with existing data entries. In such cases, correspondence between the augmented query and the existing data entries may be determined more efficiently than correspondence between the augmented query and the numerous previous queries. Alternatively, the time or computing resources associated with analysis using the data entries may exceed the time or computing resources associated with analysis using the previous queries. In such cases, correspondence between the augmented query and the previously received queries may be determined more efficiently than correspondence between the augmented query and the numerous data entries.

In some implementations, correspondence may be determined by matching keywords found within data entries to keywords within the augmented query. The particular keywords that correspond to a particular data entry and the weight associated with each keyword may be used to determine a correspondence value (e.g., a confidence value). If the correspondence value exceeds a threshold, then the particular data entry may correspond to the augmented query. At least a subset of the existing data entries that correspond to the query may be determined. In other implementations, the determined subset of data entries may include a fixed number of data entries, such as the fifty data entries that have the greatest associated correspondence values. In still other implementations, a combination of a fixed count and a threshold value may be used. For example, fifty-five out of five hundred data entries may be determined to have a correspondence value greater than a threshold value, while the determined subset may include the twenty data entries of those fifty-five that have the greatest correspondence. As another example, the twenty data entries having the greatest correspondence values may be determined, however only sixteen out of the twenty data entries may have a correspondence value greater than a threshold value. Therefore, the determined subset may include those sixteen data entries.

After determining at least a subset of the data entries that correspond to the augmented query, the augmented query may be analyzed using the previous queries for which one or more data entries of the subset was used to resolve the previous query. For example, correspondence between the augmented query and each of the previous queries may be determined. In some implementations, each query that is received and resolved using a data entry may be recorded. Data indicative of a query that is resolved using a particular data entry may be stored in association with data indicative of the data entry. Thus, each data entry of the determined subset may have been used to resolve one or more previous queries. Correspondence between the augmented query and the previous queries associated with the subset of data entries may be used to determine a particular query having a greatest correspondence value compared to the other previous queries. For example, keywords within each of the previous queries may be compared to the keywords of the augmented query to determine a correspondence value. The correspondence value may be determined by the quantity of matched words, the weight of the words that are matched, whether a keyword from the original received query is matched, whether a synonym included in the augmented query is matched, similarities between grammatical arrangements of the received query and a previous query, and so forth. In some cases, words may not necessarily be matched, but may be synonyms of a keyword or associated with keywords. For example, keywords such as "internet" and "wifi" may not be synonyms, but may occur in similar contexts. Continuing the example, a query that includes the term "internet" may correspond to a response that includes the term "wifi". The particular data entry that corresponds to the previous query having the greatest correspondence value may be included in a response to the initial query received from a user. For example, a response to the received query may include all or a portion of the text of the data entry, a link or instructions to access the data entry, and so forth.

In some implementations, if no data entry that corresponds to the augmented query is determined, correspondence may instead be determined between the augmented query and the previous queries received for each data entry. For example, if no correspondence value determined for any data entry exceeds a threshold value, no subset of data entries that correspond to the augmented query may be determined. In such a case, a particular previous query may still have keywords or other parameters that correspond to the received query. If correspondence between one or more previous queries and the augmented query is determined, one or more data entries associated with the corresponding previous queries may be relevant to the received query. The data entry associated with the previous query that has the greatest correspondence value may be used to generate a response.

If no data entry that corresponds to the augmented query is determined, and no previous query that corresponds to the augmented query is determined, a notification may be generated to request human intervention to resolve the received query. Additionally, in some implementations, correspondence may be determined between the keywords or other parameters of the received query and group data indicative of users or groups of users within an organization. This correspondence may be used to determine a group, team, or department that is suitable to receive and resolve the query. For example, the group data may associate the terms "benefits", "human", "resources", or "HR" with an e-mail address for the human resources department of a company, while the terms "computer", "configure", "set up", or "IT" are associated with the information technology department of the company. If the keywords of the query match the particular terms associated with a user, group, team, or department, the query may be provided to that entity. If no correspondence between the parameters of a received query and the group data is determined, the query may be provided to a default destination, such as one or more users responsible for routing queries or addressing queries of a general nature. The particular groups that receive and resolve queries may be stored as additional group data, so that subsequent queries having similar parameters may be provided to the same groups. In some cases, a response provided by a user or group of users may be stored in association with an indication of the query, such that the response may be provided responsive to subsequent queries having similar parameters.

In other cases, it may be more efficient to compare a received query to previously-received queries to determine previous queries that are similar to the received query, rather than to attempt to determine correspondence between the received query and a large number of existing data entries. For example, a company may store a large number of knowledge articles that may be used to respond to queries, using a newly-established ticketing system that has not yet processed a large volume of previous queries. In some implementations, the received query may be used to generate an augmented query, such as through use of natural language processing techniques, as described above. Correspondence between the augmented query and the previously received queries may then be determined. For example, a correspondence value for each previous query may be determined based on the keywords or other parameters of the previous query that match the keywords or parameters of the augmented query. At least a subset of the previous queries having a correspondence value greater than a threshold value may be determined. In other implementations, a fixed number of previous queries, such as the one hundred previous queries having the greatest correspondence values may be determined. In still other implementations, a combination of a fixed number and a threshold value may be used. After a subset of previous queries has been determined, correspondence between the augmented query and the data entries associated with the subset of previous queries may be determined. The data entry having the greatest correspondence value may be used to generate a response to the query.

In some implementations, if no previous query that corresponds to the augmented query is determined, correspondence between the augmented query and the data entries may instead be determined. If no data entry that corresponds to the augmented query is determined, a notification may be generated to request human intervention to resolve the received query. Additionally, in some implementations, as described above, correspondence between the keywords or other parameters of the query and group data indicative of users or groups of users within an organization may be used to determine a group to receive the query. If no correspondence is determined between the parameters of a received query and one or more users or user groups, the query may be provided to a default destination, such as an e-mail address associated with a user or department responsible for routing queries to other departments or resolving queries of a general nature.

Queries that are resolved using one or more of the techniques described in this disclosure may be stored for future use to analyze and resolve subsequent queries. For example, a first query may be received, and a particular data entry may be used to resolve the first query. Subsequently, a second query that is identical or similar to the first query may be received. Correspondence between the second query and the first query may be determined, and the same data entry may be used to generate a response to the second query. In some implementations, feedback data associated with a response may be determined. For example, a user receiving a response may be requested to indicate whether the response appropriately resolved the received query. If the feedback data corresponds to one or more threshold feedback values, such as an indication that the response was useful, the received query may be stored for future comparison to subsequent queries. If the feedback data deviates from the threshold feedback values, such as by indicating that the response was not useful, a notification requesting human intervention to resolve the query may be generated. In some implementations, if a query is resolved by one or more human users, the resolution by the human user(s) may function as feedback data, indicating that the particular user or group of users to which the query was provided is a suitable destination for subsequent queries having similar parameters. In other implementations, if a query is routed from a first user or group of users to a second user or group of users, this routing may function as feedback data indicating that the second user or group of users is a suitable destination for subsequent queries having similar parameters. Additionally, if the query was resolved by the generation of a data entry, the received query may be stored in association with the generated data entry, such that subsequent queries having similar parameters may be resolved using the generated data entry.

In some implementations, data associated with a received query may be used to determine a source of the query. For example, a query received via SMS may be associated with a telephone number, which may be used to identify a user, device, or account, which in turn may be used to identify a company or other organization associated with the user, device or account. As another example, a query received via a web portal from a computing device within an office may be associated with a network identifier that may be used to identify the device, department, or user account associated with the query. In some cases, particular users may not be authorized to access particular data entries. For example, a user may provide a query requesting restricted information, such as information relating to salaries or bonuses awarded to individuals within a company. Based on a lack of correspondence between the source of the query and security data that associates sources of queries with sources of data entries, it may be determined that the user or account associated with the query is not permitted to access the responsive data entry. In some implementations, a notification indicative of an attempt to access the data entry may be generated and provided to an administrator associated with the data entry. In other implementations, in place of the responsive data entry, the response to the query may include an indication of an individual to be contacted for assistance resolving the query. For example, responsive to a query associated with restricted salary information, a user that is not authorized to access a data entry that includes such information may be provided with an e-mail address of an individual in a company's human resources department that may be able to resolve the query or recommend alternate sources of information.

In other implementations, data indicative of the source of a query may be used to determine particular bodies of data entries that may be used to respond to the query. For example, a system may store data entries from multiple sources, such as respective data repositories containing data entries associated with different companies. In many cases, data entries associated with a first company may not include information that is useful to resolve queries from employees of a second company, independent of any similar keywords or other parameters that are common between a data entry and a query. Additionally, many data entries for a particular company may include information intended to be restricted to individuals associated with the particular company. As such, when a query is received, data indicative of the source of the query may be used to determine a particular device, user, account, or organization associated with the query. Correspondence between the source of the query and security data that associates sources of queries with sources of data entries may be used to determine the particular body of data entries that may be used to respond to the query.

FIG. 1 depicts a system 100 for processing a received query 102 to generate a response 104. The received query 102 may include, for example, a request for information, one or more services, and so forth. For example, a user within a company or other organization may access a user device 106 to generate a query, which may be provided from the user device 106 to a query server 108 for processing. The user device 106 may include any type of computing device including, without limitation, a smartphone, tablet computer, wearable computer, or other type of mobile or portable device, a desktop computer, laptop computer, or other type of personal computer, an automotive computer, a set-top box, a server, a game controller, and so forth. While FIG. 1 depicts a single user device 106 providing the received query 102 directly to the query server 108, in other implementations, the user device 106 may include multiple computing devices, or the user device 106 may provide the received query 102 to one or more intermediate computing devices, access points, and so forth, which in turn provide the received query 102 to the query server 108. Additionally, while FIG. 1 depicts a single query server 108 receiving the received query 102, the query server 108 may include any number and any type of computing devices including, without limitation, the types of computing devices described with regard to the user device 106. The received query 102 may include any manner of data including, without limitation, alphanumeric data, audio data, image data, and so forth. For example, FIG. 1 depicts the received query 102 including the text "How do I set up my computer to send a fax?", which may be input using a keyboard, touch sensor, or other input device associated with the user device 106. In other implementations, the received query 102 may be input using a microphone in conjunction with speech-to-text software or a camera or other image sensor in conjunction with optical character recognition software.

The received query 102 may include various parameters, such as keywords having a particular arrangement such as a grammatical structure or format. For example, the received query 102 may include a question or statement expressed in natural language. The parameters of the received query 102 may include the particular words used in the query, the arrangement of the words, the formatting of one or more words, additional characters such as punctuation, and so forth. For example, a terminal question mark may indicate that the received query 102 includes a question, the presence of intermediate periods or a word containing all capital letters may indicate that one or more terms within the received query 102 include an abbreviation or acronym, or the presence of a capitalized word within the received query 102 may indicate that the particular word is a proper noun.

A language module 110 associated with the query server 108 may process the received query 102 using language data 112, to generate an augmented query 114. The language data 112 may associate various keywords or other parameters of queries with weight values. For example, words that are unlikely to indicate the nature of a received query 102, or words that are likely to be common to a large number of unrelated queries, such as "I", "my", "to", and "a" may be assigned a low weight value, or a weight value of zero. Continuing the example, words having a weight value of zero may be disregarded or omitted from the augmented query 114. Conversely, words that are likely to indicate the nature of the received query 102 or words that are less likely to be included in a large number of other queries may be assigned a high weight value. Similarly, words that are moderately likely to indicate the nature of the received query 102 may be assigned a moderate weight value. As an illustrative example, FIG. 1 depicts the language data 112 assigning a weight value of "1" to the query term "How", a weight value of "0" to the query term "I", a weight value of "3" to the query term "Send", and a weight value of "5" to the query term "Fax". Continuing the example, in the received query 102 "How do I set up my computer to send a fax?", the term "I" does not identify the nature of the received query 102 and would be likely to occur in a large number of other unrelated queries, and is thus assigned a weight value of zero. The term "How" indicates that the received query 102 relates to a request for instructions to accomplish a task, but does not indicate the nature of the query and is likely to occur in other unrelated queries, and is thus assigned a weight value of one. The term "Send" is moderately indicative of the nature of the received query 102 and moderately likely to occur in other queries, and is thus assigned a weight value of three. The term "Fax" is highly indicative of the nature of the received query 102 and is only likely to occur in other queries relating to the transmission or configuration of a fax, and is thus assigned a weight value of five. Other terms of the received query 102 may similarly be included in the language data 112 and associated with a weight value. Words in the received query 102 that are not included in the language data 112 may be assigned a default weight value. In some implementations, the arrangement, punctuation, formatting, and so forth of particular words within the received query 102 may also be assigned a weight value.

The language data 112 may also indicate one or more synonyms associated with particular keywords within the received query 102. For example, the language data 112 may indicate the term "Transmit" is a synonym for the term "Send", the terms "Facsimile" and "Message" are synonyms for the term "Fax", the terms "Setup" and "Configure" are synonyms for the terms "Set Up", and so forth. When determining a response 104 that corresponds to the received query 102, the determined synonyms may also be used to locate corresponding materials for inclusion in the response 104. In some implementations, a single synonym may be associated with multiple words within the received query 102, such as the synonym "Configure" for the terms "Set Up". Similarly, multiple synonyms may correspond to a single term of the query, such as the synonyms "Facsimile" and "Message" for the query term "Fax".

The augmented query 114 may be generated by removing one or more terms from the received query 102 that have a weight value less than a threshold value. For example, the terms "How", "Do", "I", "My", "To", and "A" may have a weight value of zero, or a weight value less than a threshold value, such as three. The augmented query 114 may also include one or more of the synonyms determined to correspond to the terms of the received query 102. For example, in addition to the initial terms of the received query 102, the augmented query 114 may include the synonyms "Setup", "Configure", "Transmit", "Facsimile", and "Message". As a result, the initial received query 102 of "How do I set up my computer to send a fax?" may be used to generate the augmented query 114 of "Set Up Setup Configure Computer Send Transmit Fax Facsimile Message". In some implementations, the augmented query 114 may include additional data indicative of the weight values of each term included therein. In other implementations, the augmented query 114 may also include data indicative of other parameters of the received query 102, such as arrangements of words, capitalization, formatting, punctuation, and so forth.

A knowledge module 116 associated with the query server 108 may access a data repository 118 or other source of data entries 120 to determine one or more data entries 120 that correspond to the augmented query 114. A data entry 120 may include alphanumeric data, audio data, image data, or one or more other types of data that may be used to convey information to a user. For example, a data entry 120 may include a document, spreadsheet, database, web page, audio file, video file, one or more images, and so forth. Each data entry 120 within the data repository 118 may include various terms or other parameters. For example, a first data entry 120 may include information for contacting the human resources department of a company via a fax transmission, a second data entry 120 may include information for setting up an office telephone, while a third data entry 120 may include information for setting up an office computer to send and receive fax transmissions. The knowledge module 116 may determine correspondence between the parameters of the augmented query 114 and the parameters of the data entries 120 within the data repository 118 to identify a subset of data entries 120 that correspond to the augmented query 114 and may potentially be used to generate a response 104. For example, the knowledge module 116 may determine that one or more particular data entries 120 share a threshold number of common keywords with the augmented query 114. As another example, the augmented query 114 may include the indication of the weight value for one or more keywords, and the knowledge module 116 may determine a subset of data entries 120 having common keywords with the augmented query 114 that are associated with an aggregate weight value that exceeds a threshold weight value. Continuing the example, a first data entry 120 with the terms "HR" and "Fax" may share the common term "Fax" with the augmented query 114, and the term "Fax" may have a weight value of five. A second data entry 120 with the terms "Setup" and "Phone" may share the common term "Setup" with the augmented query 114, which may have a weight value of three. A third data entry 120 with the terms "Setup" and "Fax" may share both of these terms with the augmented query 114, and the aggregate weight value of these terms may be eight. If the threshold weight value is five, the knowledge module 116 may determine that the first and third data entries 120 have an aggregate weight value equal to or exceeding the threshold weight value. In some implementations, one or more data entries 120 may be accompanied by metadata indicating synonyms or associated parameters that correspond to the data entries 120. For example, a particular data entry 120 may not contain specific keywords found in a query, however, the metadata associated with that data entry 120 may indicate that those specific keywords are related to the data entry 120. Therefore, the data entry 120 may correspond to the augmented query 114 even if the data entry 120 does not contain the particular keywords found in the query.

A query module 122 associated with the query server 108 may process the data entries 120 determined by the knowledge module 116 to determine a particular responsive data entry 124 that may be used to generate the response 104 to the received query 102. The query module 122 may access query data 126, which may include data indicative of previous queries received by the query server 108. The query data 126 may indicate each data entry 120 determined by the knowledge module 116 and one or more previous queries for which a respective data entry 120 was determined to be responsive. As one illustrative example, FIG. 1 depicts the previous queries "Call HR" and "Fax HR Dept." associated with the data entry "HR Fax #", and the previous queries "Configure fax" and "Setup fax" associated with the data entry "Setup Fax". The query module 122 may determine correspondence between the previous queries for each data entry 120 determined by the knowledge module 116 and one or more of the augmented query 114 or the received query 102. For example, the query module 122 may determine common terms shared by one or more previous queries and the augmented query 114. In some implementations, the query module 122 may determine an aggregate weight value for the terms shared by each previous query and the augmented query 114 or received query 102. In one specific implementation, based on correspondence between the query data 126 and the augmented query 114 or received query 102, the query module 122 may determine a particular previous query that is more similar to the augmented query 114 or received query 102 than other precious queries associated with the data entries 120. The responsive data entry 124 may be the particular data entry 120 that is associated with the particular previous query most similar to the augmented query 114 or received query 102. In other implementations, the query module 122 may determine correspondence values associated with at least a portion of the previous queries that are associated with the data entries 120 determined by the knowledge module 116. The particular responsive data entry 124 may be determined based on a combination of the correspondence value for that data entry 120 determined by the knowledge module 116 and the correspondence values for the associated previous queries determined by the query module 122. In some implementations, if no particular previous query corresponds to the augmented query 114 or received query 102, a notification may be generated to request human intervention to resolve the received query 102. For example, if the aggregate weight value for the terms shared by each previous query and the augmented query 114 is less than a threshold value, a notification may be provided to the user device 106 indicating that human intervention has been requested to resolve the received query 102. In other implementations, if no particular previous query corresponds to the augmented query 114 or received query 102, the data entry 120 having the greatest correspondence value may be used to generate the response 104.

A response module 128 associated with the query server 108 may generate the response 104 based on the responsive data entry 124 and response data 130, which may indicate the manner in which a response 104 is to be formatted or transmitted, other data for inclusion in the response 104, and so forth. For example, the response data 130 may indicate that the instructions "Click this link to access fax configuration instructions" are to be included in a response 104 associated with the particular data entry 120 "Setup Fax". The response data 130 may also indicate particular images or links to be included, the placement and formatting of such elements, and so forth. In cases where the response data 130 does not include content or formatting specific to a particular data entry 120, the response data 130 may include default content. For example, in the absence of response data 130 for a particular data entry 120, the text of the data entry 120, itself, may be provided to the user device 106 as the response 104.

Figure 2:
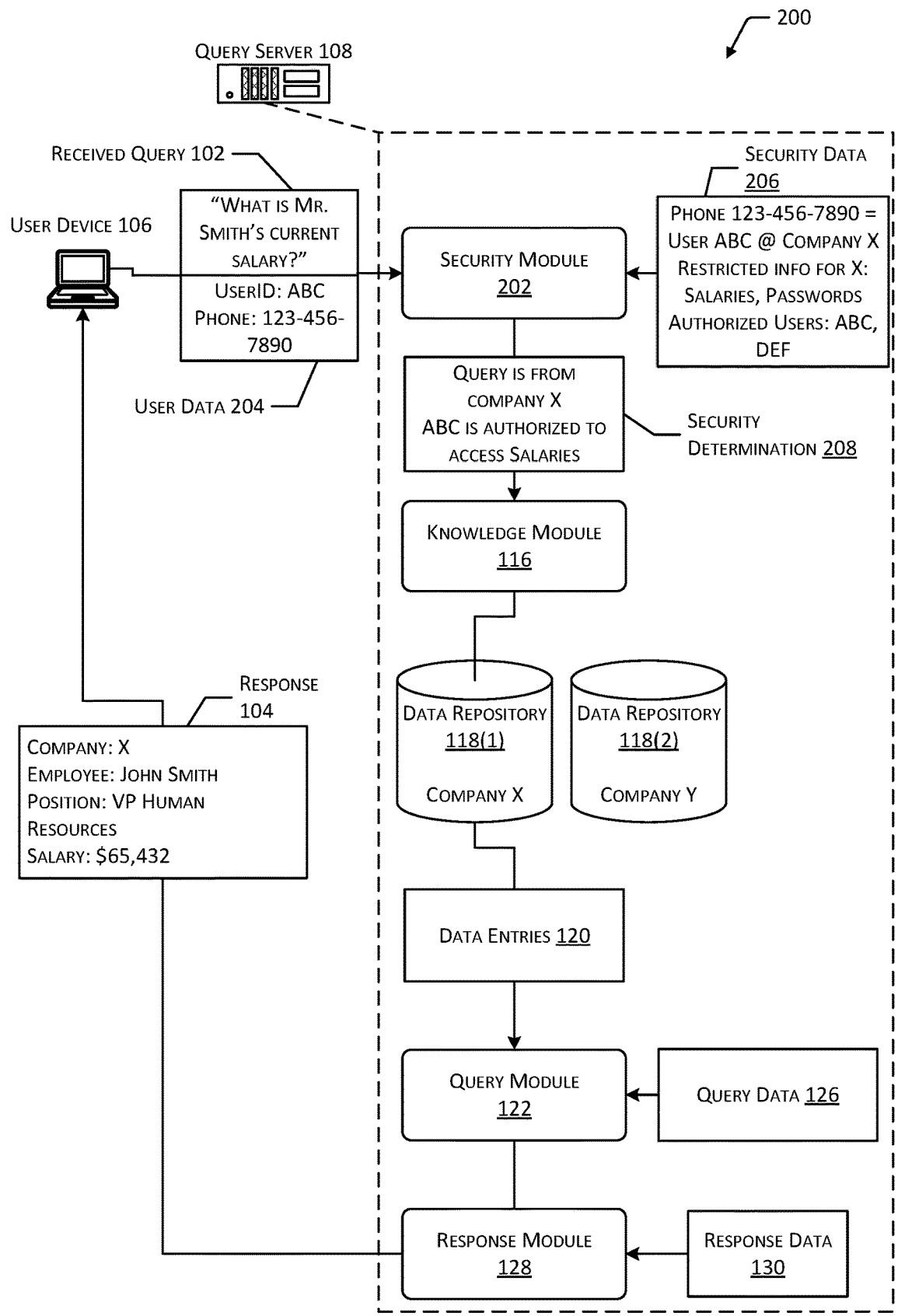
FIG. 2 depicts a system for determining particular data entries that may be accessed responsive to a received query.

FIG. 2 depicts a system 200 for determining particular data entries 120 that may be accessed responsive to a received query 102. As described with regard to FIG. 1, a user device 106 may provide a query to a query server 108. For example, the received query 102 may include the text "What is Mr. Smith's current salary?". In some cases, a received query 102 may be associated with restricted or confidential information. For example, access to information associated with employee salaries, passwords, account information, and so forth, may be restricted to particular users. In other cases, access to information contained within a particular data repository 118 may be restricted to particular users or groups of users, such as employees of a particular company or of a particular department within a company. Additionally, in some cases, a system 200 may include multiple data repositories 118 or other sources of data entries 120. For example, a first data repository 118(1) may store data entries 120 associated with a first company while a second data repository 118(2) stores data entries 120 associated with a second company. The information contained in data entries 120 associated with one company may not be useful to employees of other companies. Furthermore, information contained within data entries 120 associated with particular company may be restricted, confidential, private, proprietary, and so forth, and may be intended to be viewed only by users associated with the particular company.

In some implementations, prior to generation of a response 104, a received query 102 may be provided to a security module 202 associated with the query server 108. The security module 202 may determine correspondence between user data 204 associated with the received query 102 and security data 206. The user data 204 may include data indicative of a source of the received query 102, such as a particular user device 106, user account, company, location, and so forth. For example, the user data 204 may include a user identifier, such as a user name or account name, a device identifier, a token value, or other type of identifier. As another example, the user data 204 may include a telephone number, e-mail address, an Internet Protocol (IP) address or another type of network address, and so forth. The security data 206 may indicate particular elements of user data 204 that are indicative of users permitted to access particular data repositories 118. For example, the security data 206 may indicate one or more particular telephone numbers that may be determined from the user data 204 are associated with a particular company. Based on correspondence between the telephone number associated with a received query 102 and the security data 206, a particular data repository 118 associated with a particular company may be queried. Additionally, the security data 206 may indicate that one or more particular user accounts are authorized to access particular data entries 120, data repositories 118, or other types of information. Based on correspondence between the security data 206 and the user data 204, access may be granted to the requested data. In some implementations, if the user data 204 does not correspond to the security data 206, one or more notifications indicative of the attempted access may be provided to the user device 106 or to an administrator associated with the system 200. For example, a user that is not authorized to access a particular data entry 120 may be provided with a response 104 indicating an individual that the user should contact to resolve the query, rather than a response 104 containing information from the data entry 120.

Based on the user data 204 associated with the received query 102 and the security data 206, the security module 202 may generate a security determination 208 indicative of the particular data repository 118 to be queried, and whether the user device 106 is permitted to access the particular data repository 118. For example, based on the telephone number determined from the user data 204, the security determination 208 may indicate that the user device 106 providing the received query 102 is associated with a particular user (e.g., user "ABC") of a particular company (e.g., "Company X"). The security data 206 may further indicate particular types of restricted data, such as data associated with salaries and passwords. In other implementations, the security data 206 may indicate particular data repositories 118 or data entries 120 for which access is restricted. Correspondence between the user data 204 and the security data 206 may indicate that the user device 106 is authorized to access particular data repositories 118, data entries 120, or types or categories of data. If the user data 204 associated with a received query 102 does not correspond to the security data 206, access to a particular data repository 118 or data entry 120 may be denied. In some cases, a notification indicative of the attempted access may be provided to an administrator of the system 200. In other cases, the response 104 provided to the user device 106 may include contact information associated with a human that may assist in resolving the query rather than content associated with a restricted data entry 120.

Based in part on the security determination 208, the knowledge module 116 may access the first data repository 118(1), which may be associated with a company that corresponds to the user data 204 accompanying the received query 102. The knowledge module 116 may determine one or more data entries 120 that correspond to the parameters of the received query 102. In some implementations, a language module 110 may be used to generate an augmented query 114 based on the received query 102, as described with regard to FIG. 1, and the knowledge module 116 may determine data entries 120 that correspond to the augmented query 114. A query module 122 may determine correspondence between the determined data entries 120 and query data 126 to determine previous queries that are similar to the received query 102. Aggregate correspondence values, based on the correspondence value for each data entry 120 and the correspondence values for each previous query associated with that data entry 120, may be determined. The data entry 120 having the greatest aggregate correspondence value may be used to generate the response 104, based in part on response data 130.

Figure 3:
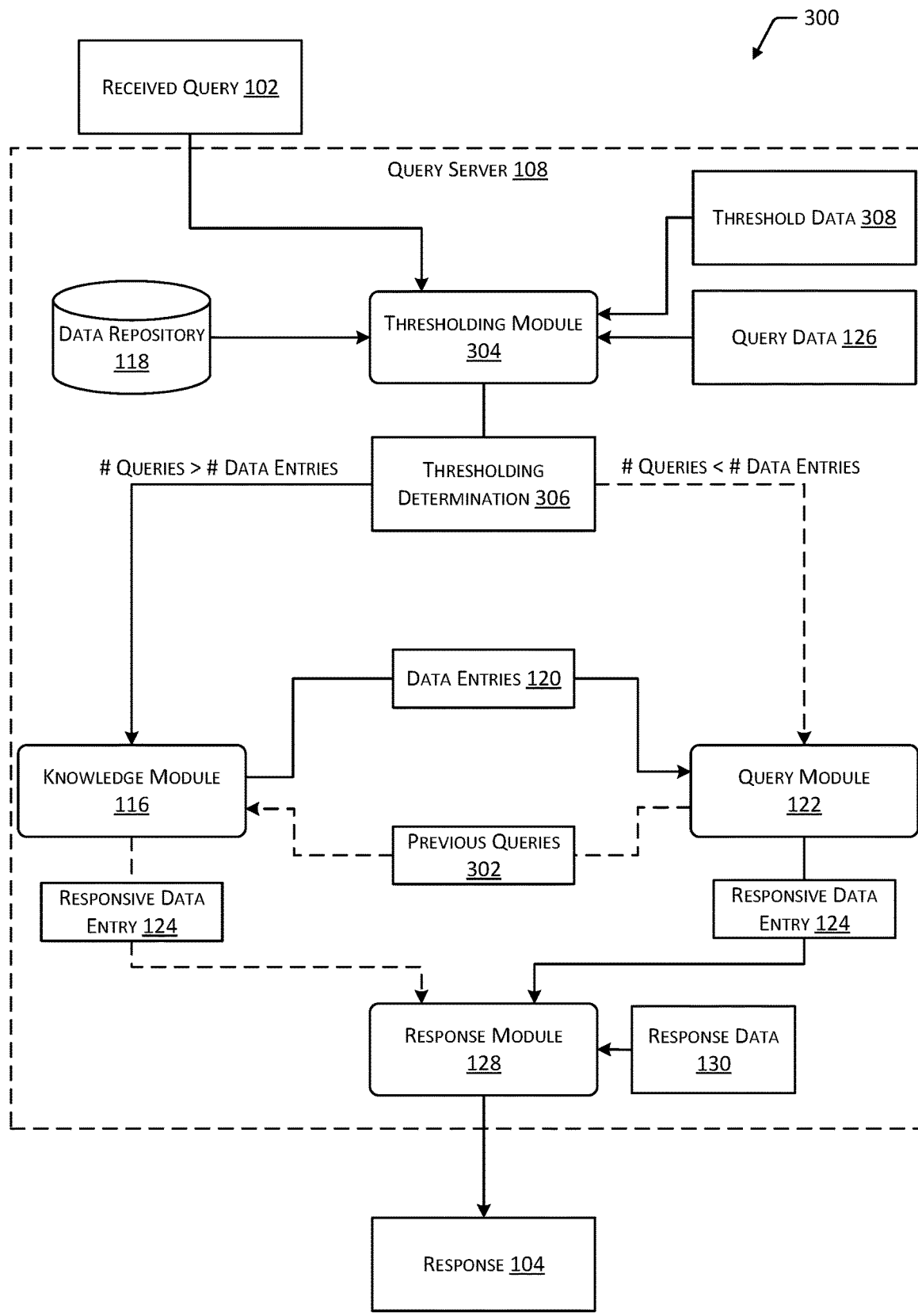
FIG. 3 depicts a system for determining a manner in which a response to a previous query may be generated based on a current quantity of existing data entries and a current quantity of previous queries.

FIG. 3 depicts a system 300 for determining a manner in which a response 104 to a received query 102 may be generated based on a current quantity of existing data entries 120 and a current quantity of previous queries 302. As described with regard to FIGS. 1 and 2, a query may be provided from a user device 106 to a query server 108, which may process the received query 102 to generate a response 104. In some implementations, a thresholding module 304 associated with the query server 108 may determine the manner in which the received query 102 is processed. For example, the thresholding module 304 may determine a current quantity of data entries 120 within a data repository 118 that may be analyzed for correspondence to the received query 102. The thresholding module 304 may also determine, based on query data 126, a current quantity of previous queries 302 associated with the data entries 120. As discussed above, if the number of existing data entries 120 exceeds the number of previous queries 302, it may be more efficient to first determine correspondence between the received query 102 and the smaller number of previous queries 302 to determine a subset of previous queries 302 that correspond to the received query 102. Then, correspondence between the received query 102 and the data entries 120 associated with the subset of previous queries 302 may be determined. If the number of previous queries 302 exceeds the number of data entries 120, it may be more efficient to first determine correspondence between the received query 102 and the data entries 120 to determine a subset of data entries 120 that correspond to the received query 102. Then, correspondence between the received query 102 and the previous queries 302 associated with the subset of data entries 120 may be determined. In other implementations, an efficiency value associated with processing of the data entries 120 or previous queries 302 may be determined in place of or in addition to determining a number of data entries 120 or previous queries 302. For example, based on the size or format associated with one or more data entries 120, determining correspondence between the data entries 120 and a received query 102 may be more efficient than determining correspondence between the received query 102 and previous queries 302, independent of the number of data entries 120 or previous queries 302.

The thresholding module 304 may generate a thresholding determination 306, indicative of whether the received query 102 will first be processed by the knowledge module 116 or the query module 122. As described with regard to FIG. 1, the knowledge module 116 may determine correspondence between the received query 102 and the data entries 120 within the data repository 118. The query module 122 may determine correspondence between the received query 102 and the previous queries 302 of the query data 126. In some implementations, the thresholding module 304 may generate the thresholding determination 306 based at least in part on threshold data 308. The threshold data 308 may indicate one or more relationships between the data entries 120 and the previous queries 302 that may determine the manner in which a received query 102 may be processed with the greatest efficiency. For example, in some cases, due to the size or format of at least a portion of the data entries 120, determining correspondence between a received query 102 and a large number of data entries 120 may be accomplished more quickly than determining correspondence between a received query 102 and a smaller number of previous queries 302. The threshold data 308 may indicate the extent to which the number of data entries 120 may exceed the number of previous queries 302 before determining correspondence between the received query 102 and the previous queries 302 may be accomplished with greater efficiency than determining correspondence between the received query 102 and the data entries 120. In other cases, determining correspondence between the received query 102 and a large number of previous queries 302 may be accomplished more quickly than determining correspondence between the received query 102 and a smaller number of data entries 120. In some implementations, the threshold data 308 may include one or more user-selected or default values. In other implementations, the threshold data 308 may be automatically or dynamically modified as additional data entries 120 and previous queries 302 are stored, based on the characteristics of each data entry 120 and previous query 302.

In cases where correspondence between a received query 102 and the data entries 120 may be determined more efficiently than correspondence between the received query 102 and the previous queries 302, the received query 102 may first be processed by the knowledge module 116. The knowledge module 116 may determine correspondence between the received query 102 and the data entries 120 in the data repository 118 to determine at least a subset of the data entries 120 that may be used to generate a response 104. The query module 122 may then determine the previous queries 302 that are associated with the subset of the data entries 120, and determine correspondence between those previous queries 302 and the received query 102. The correspondence values associated with the previous queries 302 and those associated with the data entries 120 may be used to identify the particular data entry 120 having the greatest total correspondence value, which may be included in a response 104 generated by the response module 128.

In cases where correspondence between a received query 102 and the previous queries 302 may be determined more efficiently than correspondence between the received query 102 and the data entries 120, the received query 102 may first be processed by the query module 122. The query module 122 may determine correspondence between parameters of the received query 102 and parameters of one or more previous queries 302 received by the query server 108. The knowledge module 116 may then determine the particular data entries 120 that correspond to the previous queries 302 identified by the query module 122. Based on correspondence between the received query 102 and the particular data entries 120 and between the received query 102 and the previous queries 302, a responsive data entry 124 having the greatest correspondence value may be determined. The response module 128 may generate a response 104 based on the responsive data entry 124.

Figure 4:
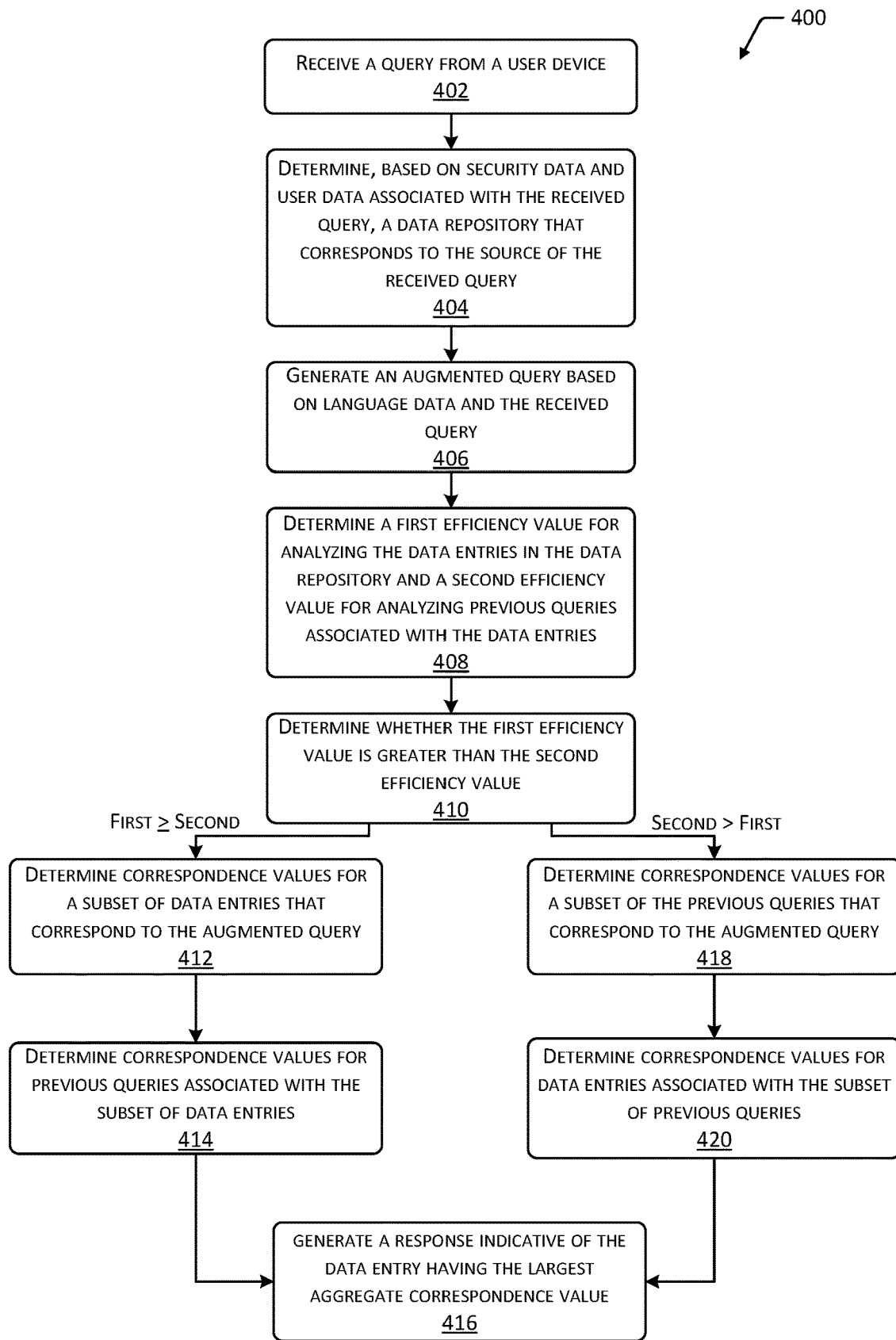
FIG. 4 is a flow diagram illustrating a method for determining a response based on a received query.

FIG. 4 is a flow diagram 400 illustrating a method for determining a response 104 based on a received query 102. Block 402 receives a query from a user device 106. For example, as described with regard to FIG. 1, a user device 106 may include any type of computing device, such as a desktop or laptop computer associated with a computing network within a company, a smartphone or tablet computer owned by an employee of the company, and so forth. A query may be generated using any type of input device associated with the user device 106, including without limitation a keyboard, mouse device, touch sensor, microphone, or image sensor. The query may then be provided to the query server 108 or other type of computing device associated with one or more data repositories 118 in various ways. For example, a smartphone may be used to provide a query to the query server 108 via SMS or a similar type of messaging service or application. As another example, a desktop computer associated with a company network may access a web portal or similar application configured to provide a user interface to the user device 106. The user interface may be configured to receive a query and in some implementations, user data 204 such as identifying information for a user account, company, or user device 106.

Block 404 determines, based on security data 206 and user data 204 associated with the received query 102, a data repository 118 that corresponds to the source of the received query 102. For example, user data 204 may be received from the user device 106, determined from the user device 106, or determined from data associated with the received query 102. The user data 204 may include information from which the source of the received query 102 may be determined. For example, the user data 204 may include user account information, such as a user name, company affiliation, and so forth. As another example, the user data 204 may include a user's telephone number, determined from a SMS communication, an IP address associated with the user device 106, and so forth. The user data 204 may be used to determine an identity of the user, user account, or user device 106 associated with the received query 102. For example, the user data 204 may be used to determine a particular company associated with the user account or user device 106 providing the query. The security data 206 may associate one or more sources of queries with one or more data repositories 118. For example, a first data repository 118 may store data entries 120 associated with a first company or department, while a second data repository 118 may store data entries associated with a second company or department. Based on the source of the received query 102 determined from the user data 204, a data repository 118 that corresponds to the source of the received query 102 may be determined from the security data 206. For example, a telephone number may be determined from a user providing a query via SMS using a smartphone. The security data 206 may associate one or more user telephone numbers with particular data repositories 118 or with particular sources of data entries 120. Continuing the example, the security data 206 may indicate that the particular telephone number associated with the received query 102 is associated with a particular employee of Company X, and that a particular data repository 118 contains data entries 120 associated with Company X. Based on this determination, the particular data repository 118 of Company X may be accessed to process the received query 102. As another example, the security data 206 may indicate that an IP address associated with the received query 102 is associated with a computing device located within a computing network of Company Y, and that the particular data repository 118 contains data entries 120 associated with Company Y. Based on this determination, the particular data repository 118 of Company Y may be accessed to process the received query 102.

Block 406 generates an augmented query 114 based on language data 112 and the received query 102. As described with regard to FIG. 1, a language module 110 associated with the query server 108 may determine one or more parameters of the received query 102. Parameters may include characteristics of the received query 102 such as particular words, characters, or groups of words or characters, arrangements of words or characters, such a grammatical structure, a format of one or more portions of the received query 102, a language of the received query 102, and so forth. In some implementations, the received query 102 may include types of data other than or in addition to alphanumeric data, such as image data, audio data, video data, or haptic data. In such cases, the parameters of the received query 102 may also include the type, location, and characteristics of this data. The language data 112 may associate particular parameters of queries with weight values. For example, particular words within the received query 102 that do not demonstrate the nature of the received query 102 and that commonly occur in many queries may be associated with a low weight value. Words that relate to the nature of the received query 102 and that are not commonly found in other queries may be associated with a high weight value. Other types of parameters of the received query 102 may also be associated with particular weight values. The language data 112 may also associate one or more synonyms with particular words. In some implementations, the language data 112 may also associate synonyms with other parameters of the received query 102. For example, a particular grammatical structure may be considered to be synonymous with another grammatical structure. Generation of the augmented query 114 may include removing one or more words or other parameters from the received query 102. For example, particular words such as "a" may have a weight value of zero. Generation of the augmented query 114 may also include adding one or more words or other parameters to the received query 102. For example, the term "HR" may include the synonyms "Human Resources", "H.R.", "Human Resources Department", and so forth. The augmented query 114 may also include an indication of other parameters, such as arrangements or formats of words or characters. The augmented query 114 may further include an indication of the weight value associated with each word or other parameter. In some implementations, a synonym may have a weight value equal to that of the parameter of the received query 102 associated with the synonym. In other implementations, a synonym may include a weight value different from that of the associated parameter in the received query 102.

Block 408 determines a first efficiency value for analyzing the data entries 120 in the data repository 118 and a second efficiency value for analyzing previous queries 302 associated with the data entries 120. As described with regard to FIG. 3, a thresholding module 304 may generate a threshold determination 306 indicative of whether it would be more efficient to first analyze the augmented query 114 based on the data entries 120 in the data repositories, or to first analyze the augmented query 114 based on the previous queries 302 associated with the data entries 120. To facilitate generation of the threshold determination 306, the thresholding module 304 may determine an efficiency value associated with each analysis. The efficiency value may be measured using one or more of elapsed time, computing cycles or other computational resources, electrical power or other resources, and so forth. In some implementations, determining an efficiency value may include determining a number, size, format, or other characteristics of the data entries 120 in the data repository 118, and a number, size, format, or other characteristics of the previous queries 302. In some implementations, the efficiency value(s) may include a numeric or quantifiable value. In other implementations, the efficiency value may include a comparison between characteristics of the data entries 120 and characteristics of the previous queries 302 that may not necessarily be expressed as a number or quantifiable value.

Block 410 determines whether the first efficiency value is greater than the second efficiency value. In cases where the efficiency values are not expressed as quantities, block 410 may determine whether the first and second efficiency values indicate whether analysis of the augmented query 114 using the data entries 120 prior to the previous queries 302 would be more economical, faster, or more advantageous than analysis of the received query 102 using the previous queries 302 prior to the data entries 120.

If the first efficiency value is greater than the second efficiency value, this may indicate that analysis of the augmented query 114 using the data entries 120 prior to the previous queries 302 is more efficient than first analyzing the augmented query 114 using the previous queries 302. Block 412 may be performed if the first efficiency value is greater than or equal to the second efficiency value. Block 412 may determine correspondence values for a subset of the data entries 120 that correspond to the augmented query 114. As described with regard to FIG. 1, a knowledge module 116 associated with the query server 108 may determine correspondence between the data entries 120 in the data repository 118 and the augmented query 114. Determining this correspondence may include determining correspondence values for the data entries 120. The correspondence value for a particular data entry 120 may be determined based on parameters that are common between the augmented query 114 and the particular data entry 120 and in some cases, the weight values for the parameters. In one example implementation, a correspondence value may be determined by calculating the sum of the weight values for each parameter shared by the particular data entry 120 and the augmented query 114. The knowledge module 116 may determine the subset of the data entries 120 by determining a selected number of data entries 120 having the greatest correspondence values, such as the data entries 120 associated with the one-hundred greatest correspondence values. In other implementations, the knowledge module 116 may determine the subset of data entries 120 by determining the data entries 120 having an associated correspondence value that exceeds a threshold correspondence value. In still other implementations, the knowledge module 116 may determine the subset of data entries 120 using a combination of threshold values and a selected number of data entries 120.

Block 414 determines correspondence values for particular previous queries 302 associated with the subset of data entries 120. As described with regard to FIGS. 1 and 3, a query module 122 associated with the query server 108 may determine the previous queries 302 that are associated with the subset of data entries 120 determined by the knowledge module 116. A previous query 302 may be associated with a data entry 120 if the response 104 to that previous query 302 included information indicative of the data entry 120. In some cases, the previous query 302 may be associated with the data entry 120 only if feedback data indicating that the response 104 led to the resolution of the previous query 302 was received. Query data 126 may indicate the associations between each data entry 120 and one or more previous queries 302. The query module 122 may determine correspondence between each of the previous queries 302 associated with the determined subset of data entries 120 and the augmented query 114. For example, determining correspondence may include determining correspondence values for the previous queries 302. The correspondence value for a particular previous query 302 may be determined based on parameters that are common between the augmented query 114 and the particular previous query 302 and in some cases, the weight values for the parameters. In some implementations, if no correspondence value for a previous query 302 exceeds a threshold correspondence value, a notification may instead be generated to request human intervention to resolve the received query 102.

Block 416 generates a response 104 indicative of the data entry 120 having the largest aggregate correspondence value. The aggregate correspondence value may be based on the correspondence value determined between the query and the data entry 120. The aggregate correspondence value may also be based on one or more correspondence values determined between the query and the previous queries 302 that are associated with the data entry 120. The response 104 may include at least a portion of the content of the data entry 120. In other implementations, the response 104 may include a link or description of the data entry 120 or instructions for accessing the data entry 120. A response module 128 associated with the query server 108 may generate the response 104. In some implementations, the response 104 may be based at least partially on response data 130, which may indicate particular formats, types of data, or other information to be included in the response 104.

If the second efficiency value is greater than the first efficiency value, this may indicate that analysis of the augmented query 114 using the previous queries 302 prior to the data entries 120 is more efficient than first analyzing the augmented query 114 using the data entries 120. Block 418 may be performed if the first efficiency value is less than the second efficiency value. Block 418 determines correspondence values for a subset of the previous queries 302 that correspond to the augmented query 114. The query module 122 may determine correspondence between the parameters of the previous queries 302 associated with the data entries 120 in the data repository 118 and the parameters of the augmented query 114. Determination of this correspondence may include determining correspondence values for the previous queries 302. In one implementation, a correspondence value for a particular previous query 302 may be determined by calculating the sum of the weight values for each parameter shared by the augmented query 114 and the particular previous query 302. The subset of previous queries 302 may include a preselected number of previous queries 302, such as the fifty previous queries 302 having the greatest associated correspondence values. In other implementations, the subset of previous queries 302 may include previous queries 302 having a correspondence value that exceeds a threshold correspondence value. In still other implementations, the subset of previous queries 302 may be determined using a combination of threshold values and preselected numbers of previous queries 302.

Block 420 determines correspondence values for data entries 120 associated with the subset of previous queries 302. For example, the knowledge module 116 may determine a portion of the data entries 120 that are associated with the subset of previous queries 302. The associated data entries 120 may include the data entries 120 that were used to generate responses 104 to the subset of previous queries 302. In some implementations, a data entry 120 may be associated with a previous query 302 only if feedback data indicating that the response 104 led to the resolution of the previous query 302 was received. The correspondence value for a particular data entry 120 may be determined based on parameters that are common between the augmented query 114 and the particular data entry 120 and in some cases, the weight values for the parameters. In some implementations, if no correspondence value for a data entry 120 exceeds a threshold correspondence value, a notification may instead be generated to request human intervention to resolve the received query 102.

After performance of block 420, block 416 may be performed to determine the particular data entry 120 having the largest correspondence value. Block 416 generates a response 104 indicative of the particular data entry 120. The response 104 may include at least a portion of the content of the particular data entry 120. In other implementations, the response 104 may include a link or other means to access the data entry 120 or instructions regarding the manner in which the data entry 120 may be accessed.

Figure 5:
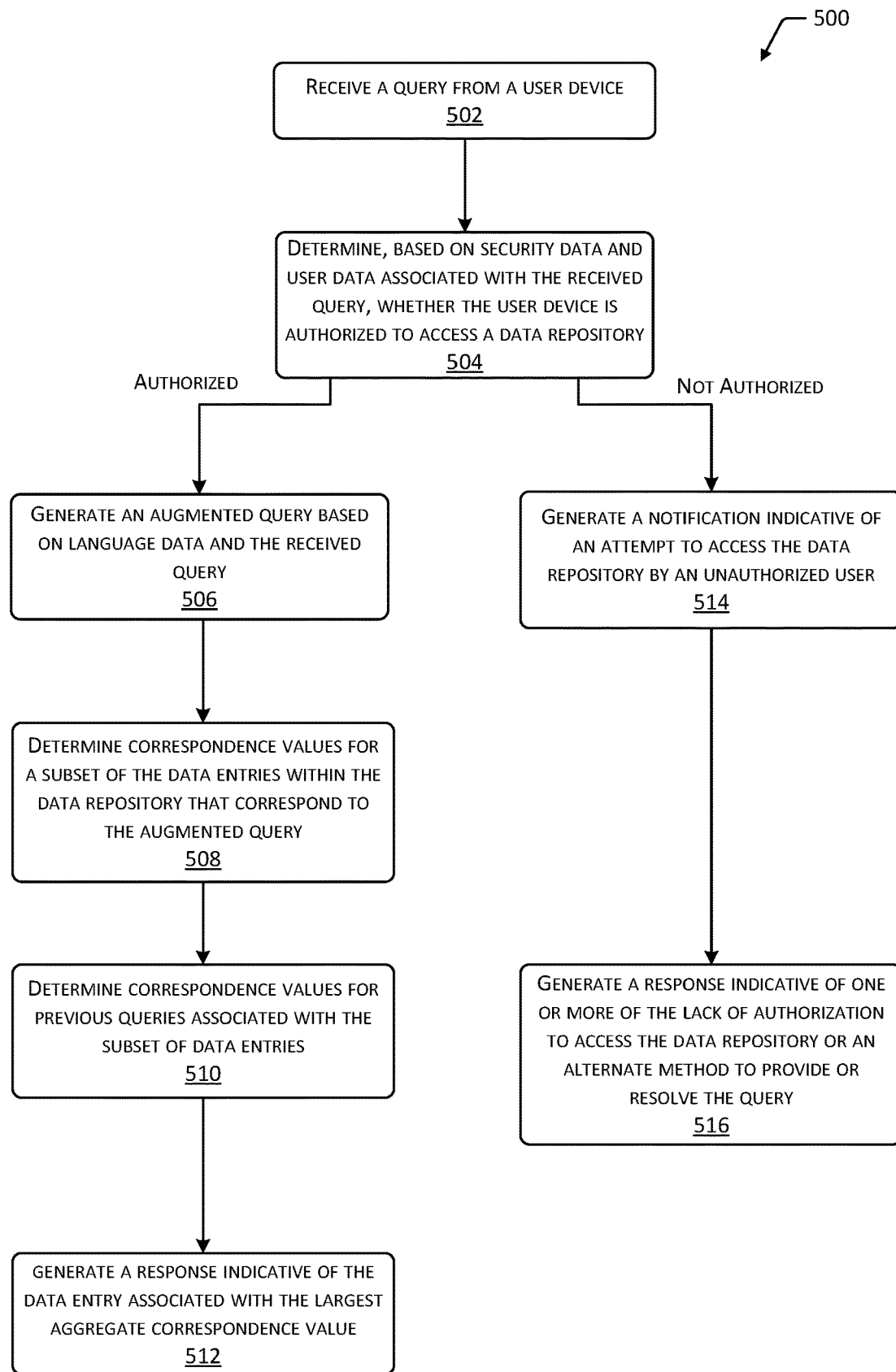
FIG. 5 is a flow diagram illustrating a method for generating responses and notifications based on whether a user is authorized to access a data entry or data repository.

FIG. 5 is a flow diagram 500 illustrating a method for generating responses 104 and notifications based on whether a user is authorized to access a data entry 120 or data repository 118. Block 502 receives a query from a user device 106. As described with regard to FIG. 1, a user device 106 may generate and provide a received query 102 to a query server 108. User data 204 associated with the received query 102 may be used to determine a source of the received query 102.

Block 504 determines, based on security data 206 and user data 204 associated with the received query 102, whether the user device 106 is authorized to access a data repository 118. As described with regard to FIG. 2, a security module 202 associated with the query server 108 may determine correspondence between the user data 204 and security data 206 that associates sources of queries with sources of data entries 120. Correspondence between the user data 204 and the security data 206 may indicate that the user device 106 is permitted to access a particular data repository 118. A lack of correspondence between the user data 204 and the security data 206 may indicate that the user device 106 is not authorized to access the data repository 118. In some implementations, a user device 106 may be permitted to access certain data entries 120 within a data repository 118, but not other data entries 120 therein. In such cases, the security module 202 or another module associated with the query server 108 may determine correspondence between one or more of the terms or parameters in the received query 102 and security data 206 that indicates the particular terms or parameters for which access may be restricted. Correspondence between the parameters may indicate that the user device 106 is not authorized to access the data entries 120 that may be responsive to the received query 102 unless the source of the query indicated in the user data 204 corresponds to the authorized users indicated in the security data 206.

If the user data 204 corresponds to the security data 206, this correspondence may indicate that the user device 106 is authorized to access a data repository 118 or data entry 120. Block 506 may be performed based on this correspondence. Block 506 generates an augmented query 114 based on the language data 112 and the received query 102. As described with regard to FIGS. 1 and 4, a language module 110 associated with the query server 108 may add or remove parameters to or from the received query and associate weight values with at least a portion of the parameters to generate the augmented query 114.

Block 508 may then determine correspondence values for a subset of the data entries 120 within the data repository 118 that correspond to the augmented query 114. A correspondence value for a particular data entry 120 may be determined based on the parameters that are common between the augmented query 114 and the particular data entry 120. The subset of data entries 120 may include a fixed quantity of data entries 120, a set of data entries 120 having a correspondence value that exceeds a threshold, or may be determined using a combination of threshold values or fixed quantities.

In some implementations, after determination of the subset of data entries 120, the security module 202 may determine correspondence between the subset of data entries 120, the security data 206, and the user data 204. This correspondence may indicate whether the user device 106 is authorized to access one or more of the particular data entries 120 within the subset.

Block 510 determines correspondence values for previous queries 302 associated with the subset of data entries 120. As described with regard to FIGS. 1 and 3, a query module 122 associated with the query server 108 may determine the previous queries 302 associated with the subset of the data entries 120 determined by the knowledge module 116. The query module 122 may also determine correspondence between the previous queries 302 and the augmented query 114, such as by determining common parameters shared by the previous queries 302 and augmented query 114. Block 512 generates a response 104 indicative of the data entry 120 associated with the largest aggregate correspondence value, which may be based on the correspondence values determined at block 508 and 510.

In some implementations, after determination of the particular data entry 120 that may be used to generate a response 104, but prior to providing a response 104 to the user device 106, the security module 202 may determine correspondence between the particular data entry 120, the security data 206, and the user data 204. This correspondence may indicate whether the user device 106 is authorized to access the particular data entry 120.

If block 504 determines a lack of correspondence between the security data 206 and the user data 204, this lack of correspondence may indicate that the user device 106 is not authorized to access the data repository 118 or one or more of the data entries 120. Block 514 may be performed responsive to determination of a lack of correspondence between the user data 204 and security data 206. Block 514 generates a notification indicative of an attempt to access the data repository 118 by an unauthorized user. For example, such a notification may be provided to an administrator associated with the data repository 118. A notification may include an indication of the user data 204, all or a portion of the received query 102, an indication of the data repository 118 or data entry 120 that may be applicable to the received query 102, and so forth.

Block 516 may generate a response 104 indicative of one or more of the lack of authorization to access the data repository 118 or an alternate method to provide or resolve the query. For example, a response 104 may be provided to the user device 106 that indicates the user device 106 is not authorized to access one or more sources of data applicable to the received query 102. In some implementations, the response may include additional information, such as other sources of data that the user device 106 may be authorized to access, instructions for requesting human intervention to resolve the query, instructions regarding particular individuals or departments that may be contacted to resolve the query or to obtain authorization to access particular sources of data, and so forth.

Figure 6:
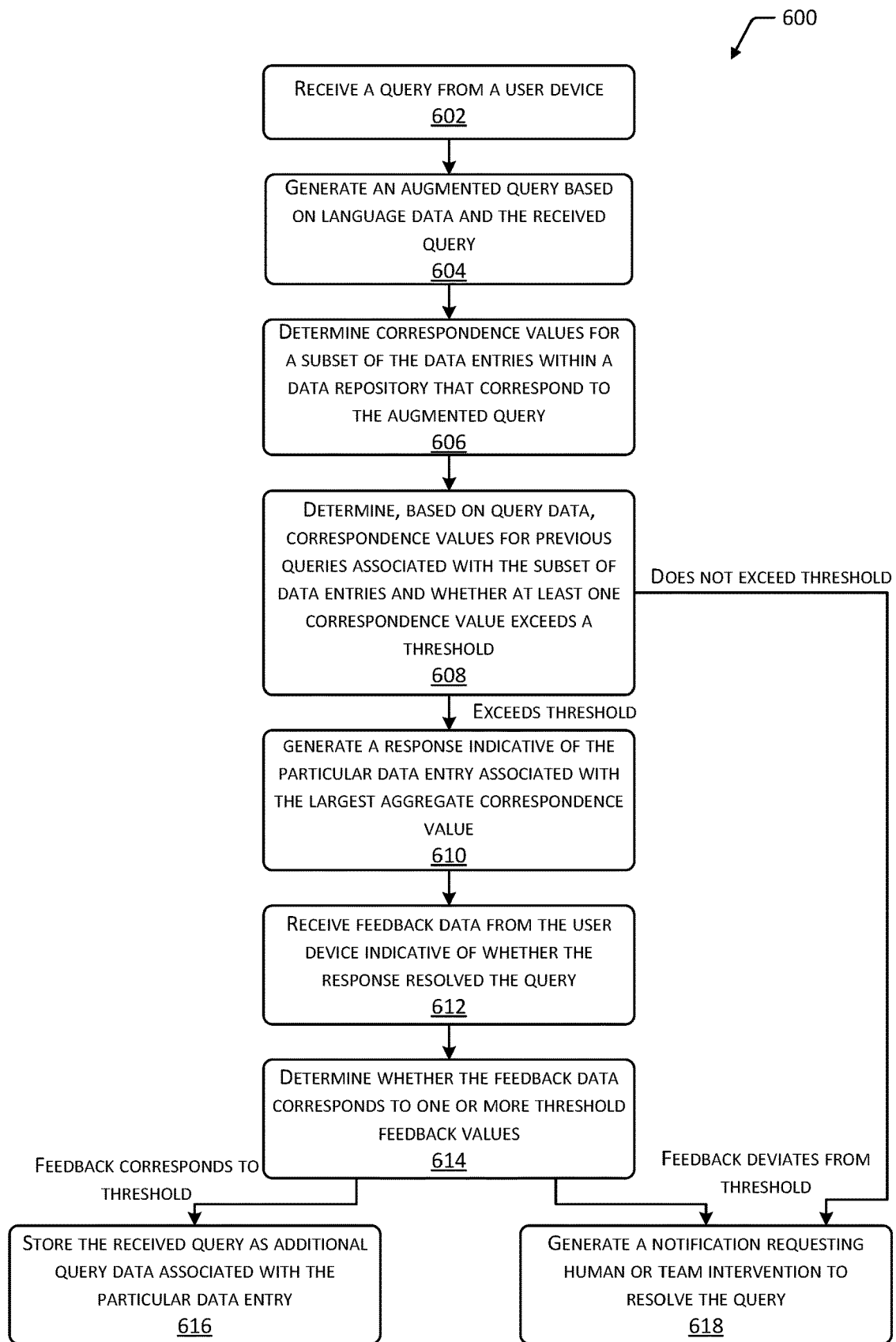
FIG. 6 is a flow diagram illustrating a method for providing a response to a query and receiving feedback data indicative of whether the response resolved the query.

FIG. 6 is a flow diagram 600 illustrating a method for providing a response 104 to a query and receiving feedback data indicative of whether the response 104 resolved the query. Block 602 receives a query from a user device 106. The received query 102 may include any manner of data, such as alphanumeric data expressing a question or search query in natural language.

Block 604 generates an augmented query 114 based on language data 112. As discussed with regard to FIGS. 1, 4, and 5, to generate the augmented query 114, a language module 110 associated with the query server 108 may add or remove parameters to or from the received query 102 and associate weight values with one or more of the parameters.

Block 606 determines correspondence values for a subset of the data entries 120 within a data repository 118 that correspond to the augmented query 114. For example, a knowledge module 116 associated with the query server 108 may determine particular data entries 120 having parameters in common with the augmented query 114. Based on the particular common parameters and the weight values associated with each parameter, a correspondence value may be determined for each data entry 120. The subset of data entries 120 determined by the knowledge module 116 may include data entries 120 having a correspondence value in excess of a threshold or a fixed number of data entries 120. In other implementations, the subset of data entries 120 may be determined using a combination of threshold values and fixed quantities.

Block 608 determines, based on query data 126, correspondence values for previous queries 302 associated with the subset of data entries 120, and whether at least one correspondence value exceeds a threshold. For example, a query module 122 associated with the query sever 108 may determine the previous queries 302 that are associated with the subset of data entries 120 determined by the knowledge module 116. The query data 126 may associate particular previous queries 302 with data entries 120 that were used to generate a response 104 to those previous queries 302. The query module 122 may also determine correspondence between the previous queries 302 and the augmented query 114, which may include determining correspondence values for the previous queries 302 based on common parameters and the weight values associated with each parameter. If none of the correspondence values exceed a selected threshold value, then none of the determined data entries 120 or previous queries 302 may be suitable for generation of a response 104. In such a case, the method may proceed to block 618 to intervention by a human or team of humans to resolve the query.

If at least one correspondence value exceeds the threshold, block 610 generates a response 104 indicative of the particular data entry 120 that is associated with the largest aggregate correspondence value. The response 104 may include all or a portion of the data entry 120, a link or other means by which the data entry 120 may be accessed, instructions for accessing the data entry 120, and so forth.

Block 612 receives feedback data from the user device 106 indicative of whether the response 104 resolved the query. For example, subsequent to providing the response 104, a user interface may be provided to the user device 106 requesting feedback data. In other implementations, resolution of the received query 102 may be determined in the absence of user-input feedback data. For example, a received query 102 may request instructions for configuring a computing device to access a particular network. Subsequently, if access to the network by the computing device is detected, this detection may indicate that the response 104 resolved the received query 102. As another example, subsequent to a response 104, the user device 106 may provide a communication to an individual or group of individuals responsible for resolving queries. Based on this communication, it may be determined that the response 104 did not resolve the received query 102.

Block 614 determines whether the feedback data corresponds to one or more feedback values. For example, a user interface requesting feedback data may request that a user select or indicate text, a button, a link, or another type of feature, to indicate whether the response 104 resolved the received query 102. Continuing the example, a threshold feedback value may include selection of a button labeled "Yes". If the feedback data corresponds to a threshold feedback value, this may indicate that the response 104 was useful in resolving the received query 102. If the feedback data deviates from the threshold feedback value(s), this may indicate that the response 104 was not useful in resolving the received query 102.

If the feedback data corresponds to a threshold feedback value, block 616 may be performed. Block 616 stores the received query 102 as additional query data 126 associated with the particular data entry 120 that was used to generate the response 104. Subsequently, if another query similar to the received query 102 is received by the query server 108, similarities between this query and the received query 102 may facilitate use of the associated data entry 120 to resolve the subsequent query.

If the feedback data does not correspond to a threshold feedback value, block 618 may be performed. Block 618 generates a notification requesting human or team intervention to resolve the query. In other implementations, additional data entries 120 may be queried or provided to the user device 106. For example, if the data entry 120 associated with the previous query 302 having the greatest correspondence value is not useful to resolve a query, the data entry 120 associated with the previous query 302 having the second greatest correspondence value may be used to generate a second response 104. In some implementations, an indication of the lack of correspondence between the feedback value and the threshold feedback value(s) may be stored as additional query data 126. For example, if a particular data entry 120 was not useful to resolve a particular received query 102, generation of additional query data 126 indicative of this result may decrease the likelihood that the particular data entry 120 will correspond to subsequent similar queries. Continuing the example, the additional query data 126 may include the addition of parameters having negative weights, the reduction of weights associated with existing parameters, and so forth.

In some implementations, block 618 may determine a particular type of human or team intervention to be requested. For example, a team or individual user may be associated with group data. The group data may include a title or description associated with a human or team, an indication of previous data entries 120 created or edited by the human or team, an indication of previous requests addressed or resolved by the human or team, and so forth. Continuing the example, if a received query 102 corresponds with the group data for a particular team within a threshold level of correspondence, the received query may be provided to the particular team. In cases where a received query 102 does not correspond to the group data for any human or team within the threshold level of correspondence, the received query 102 may be provided to a human or team tasked to resolve general queries or to route queries to other sources.

In each instance that human intervention is used to resolve a query, an indication of the particular team or human that addressed the query may be stored as additional query data 126. If the resolution involved the creation, editing, or use of a particular data entry 120, the query data 126 may also include an indication of the data entry 120.

Figure 7:
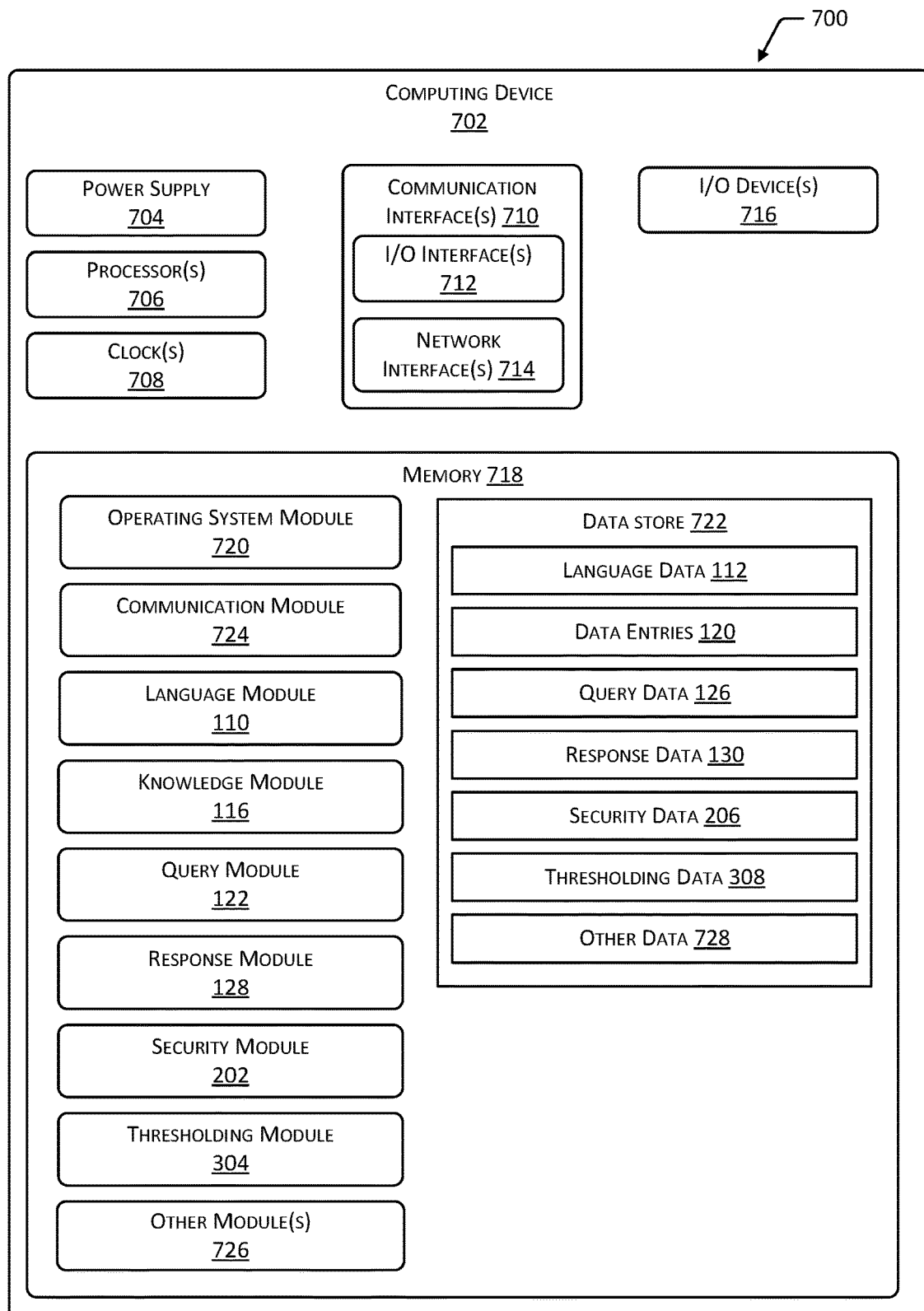
FIG. 7 is a block diagram depicting a computing device within the scope of the present disclosure.

FIG. 7 is a block diagram 700 depicting a computing device 702 within the scope of the present disclosure. The computing device 702 may include, without limitation, one or more servers, personal computers, smartphones or other mobile devices, set-top boxes, tablet computers, wearable computers, automotive computers, and so forth. For example, the computing device 702 may include a query server 108, such as the query server 108 described with regard to FIGS. 1-3. Additionally, while FIG. 7 depicts a single example computing device 702, in some implementations, computing functions described within the scope of the present disclosure may be performed by multiple computing devices 702, such as a distributed network of query servers 108 or other computing devices 702 in communication therewith. For example, a first computing device 702 may store one or more modules that may act upon data stored in a second computing device 702.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, and so forth.

The computing device 702 may include one or more communication interface(s) 710, such as input/output (I/O) interface(s) 712, network interface(s) 714, and so forth. The communication interfaces 710 may enable the computing device 702, or components of the computing device 702, to communicate with other computing devices 702 or components thereof. The I/O interface(s) 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O device(s) 716. The I/O devices 716 may include any manner of input device or output device associated with the computing device 702 or with another computing device 702 in communication therewith. For example, I/O devices 716 may include touch sensors, keyboards, mouse devices, microphones, image sensors (e.g., cameras), scanners, displays, speakers, lights, haptic devices, printers, motion sensors, location sensors, and so forth. In some implementations, the I/O device(s) 716 may be physically incorporated with a computing device 702 or may be externally placed.

The network interface(s) 714 may be configured to provide communications between the computing device 702 and other devices, such as the I/O devices 716, routers, access points, user devices 106, other computing devices 702, and so forth. The network interface(s) 714 may include devices configured to couple to one or more networks, including local area networks (LANs), wireless LANs, wide area networks (WANs), wireless WANs, and so forth. For example, the network interfaces 714 may include computing devices 702 compatible with Ethernet, Wi-Fi, Wi-Fi Direct, Bluetooth, Bluetooth Low Energy, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720.
The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 722 and one or more of the following modules may also be stored in the memory 718. The modules may be executed as foreground applications, background tasks, daemons, and so forth. The data store 722 may use a flat file, database, linked list, tree, executable code, script, or other data structure to store information. In some implementations, the data store 722 or a portion of the data store 722 may be distributed across one or more other devices including other computing devices 702, network attached storage devices, and so forth.

A communication module 724 stored in the memory 718 may be configured to establish communications with user devices 106, query servers 108, or other computing devices 702. For example, the communication module 724 may be configured to receive queries from user devices 106 or other computing devices 702 and to provide responses 104 or other data to other computing devices 702.

The memory 718 may store a language module 110. The language module 110 may be configured to determine parameters of a received query 102. For example, a received query 102 may include one or more of alphanumeric data, video data, audio data, image data, or other types of data. The language module 110 may determine the types of data within the received query 102 and particular parameters associated with one or more types of data. For example, the language module 110 may determine particular words within a received query 102, such as by determining correspondence between alphanumeric data in the received query 102 and language data 112, which in some implementations may include dictionary data indicative of words of one or more natural languages. As another example, the language module 110 may include an optical character recognition (OCR) module configured to recognize text embedded within image data, an image recognition module configured to recognize characteristics of images, and so forth. As yet another example, the language module 110 may include a speech recognition, speech-to-text, or text-to-speech module configured to determine words present in audio data.

Based on the language data 112, the language module 110 may determine a weight value associated with one or more of the parameters determined in the received query 102. For example, the language data 112 may associate particular query parameters with corresponding weight values. Continuing the example, words within a received query 102 that are not indicative of the purpose of the received query 102 and may commonly occur in many queries may have a weight value of zero or a low weight value. Words that are indicative of the purpose of the received query 102 and do not commonly occur within other queries may have a high weight value. In some implementations, the language module 110 may be configured to remove one or more parameters from the received query 102 when generating an augmented query 114. For example, query parameters having a weight value of zero or a weight value less than a threshold weight value may be removed from the received query 102 to generate the augmented query 114. In some implementations, parameters that lack an associated weight value may be assigned a default weight value. In other implementations, parameters that lack an associated weight value may be disregarded.

In some implementations, the language data 112 may also associate one or more synonyms with particular query parameters. In such cases, the language module 110 may add one or more synonyms to the received query 102 to generate the augmented query 114. The augmented query 114 may include an indication of the weight value of each parameter. In some implementations, a synonym may have a weight value equal to the weight value of the query parameter for which the synonym was determined. In other implementations, a synonym may be associated with a different weight value than that of the query parameter for which the synonym was determined.

The memory 718 may also store the knowledge module 116. The knowledge module 116 may be configured to determine correspondence between an augmented query 114 and one or more data entries 120. For example, the augmented query 114 may include one or more parameters, such as the query parameters determined by the language module 110 and the parameters added to the received query 102 by the language module 110 to generate the augmented query 114. Each data entry 120 may also include one or more parameters. For example, a data entry 120 may include one or more of alphanumeric data, audio data, video data, image data, and so forth. Continuing the example, the data entry 120 may include one or more words or groups of words, one or more grammatical elements or arrangements of words, or other parameters that are included in the augmented query 114. Each parameter common between the data entry 120 and augmented query 114 may have an associated weight value, indicated in the language data 112. In some implementations, the knowledge module 116 may determine a correspondence value for each data entry 120 based on the common parameters for each data entry 120 that are shared with the augmented query 114, and the weight value for each parameter.

In some implementations, the knowledge module 116 may be configured to determine a subset of the data entries 120. The subset of data entries 120 may include all data entries having a correspondence value greater than a threshold correspondence value. In other implementations, the knowledge module 116 may be configured to determine a selected quantity of data entries 120, such as the forty data entries 120 having the greatest forty correspondence values. In still other implementations, the subset of data entries 120 may be determined using a combination of threshold correspondence values and a selected quantity of data entries 120. For example, the knowledge module 116 may determine the twenty data entries 120 having the greatest correspondence values, as long as each correspondence value exceeds a threshold correspondence value. In cases, where twenty of the data entries 120 do not have correspondence values that exceed the threshold correspondence value, only the data entries 120 having a correspondence value in excess of the threshold may be included in the subset.

The memory 718 may also include the query module 122. The query module 122 may be configured to determine, based on query data 126, the correspondence values for previous queries 302 received by the computing device 702 that are associated with the subset of data entries 120 determined by the knowledge module 116. For example, the query data 126 may associate particular previous queries 302 with particular data entries 120. The query module 122 may also determine correspondence between previous queries 302 and the augmented query 114. For example, each previous query 302 may include one or more parameters, such as words, grammatical structures, formats, images, audio data, and so forth. A particular previous query 302 may have one or more parameters in common with the augmented query 114. Based on the weight value for each common parameter, as indicated in the language data 112, a correspondence value for the previous query 302 may be determined.

The memory 718 may additionally store the response module 128. The response module 128 or the query module 122 may be configured to determine the particular data entry 120 that corresponds to the previous query 302 having the greatest correspondence value. The response module 128 may generate a response 104 based on the particular data entry 120 and response data 130. The response data 130 may include alphanumeric data, audio data, video data, image data, or other data that may be included in the response 104, one or more formats or arrangements of data, and so forth. For example, the response data 130 may include one or more fonts, templates, styles, and so forth that may be applied to the text of the particular data entry 120. As another example, the response data 130 may include instructional text to be provided in association with a hyperlink that may be used to access the particular data entry 120. In some implementations, different response data 130 may be associated with different data entries 120. For example, a response 104 associated with a first data entry 120 may include the full text of that data entry 120, presented in a particular font and arrangement indicated in the response data 130. A response 104 associated with a second data entry 120 may include instructional text and a hyperlink used to access the second data entry 120.

The memory 718 may further store the security module 202. The security module 202 may determine correspondence between user data 204, determined from a received query 102, and security data 206, to determine whether a particular user device 106 is authorized to access a data repository 118 or data entry 120. For example, security data 206 may associate sources of queries with sources of data entries 120. A source of the received query 102 may be determined based on the user data 204. For example, the user data 204 may include an IP address or other network address or identifier. The security data 206 may associate various network addresses or identifiers with corresponding sources of queries, such as user accounts, user names or identifiers, user companies, and so forth. As such, the security data 206 may indicate particular sources of queries, such as user devices 106 or user accounts, that are authorized to access particular data entries 120 or particular sources of data entries 120. Based on correspondence between the user data 204 and the security data 206, the security module 202 may determine whether a user device 106 is authorized to access a specific data entry 120 or data repository 118 and either cause the user device 106 to be provided with access or prevent access by the user device 106. In some implementations, the security module 202 may generate one or more notifications indicative of a successful or unsuccessful attempt to access a particular data entry 120 or data repository 118. In some cases, notifications may be provided to an administrator associated with the computing device 702. In other cases, notifications may be provided to the user device 106 submitting the query. In some implementations, based on a lack of correspondence between the user data 204 and security data 206, the security module 202 may generate a response 104 to a received query 102 that indicates one or more of a lack of authorization to access applicable data sources, alternate means for resolving the query, contact information for individuals or groups of individuals that may assist with resolving the query or obtaining access to the data sources, and so forth. The particular content of such a response 104 may be determined based in part on the particular data entry 120 or data repository 118 associated with the received query 102, the response data 130, and the security data 206.

The memory 718 may also store the thresholding module 304. The thresholding module 304 may determine the quantity and characteristics (e.g., data size, data types, formats) of the data entries 120 and previous queries 302 stored in the data store 722. Based on the quantity and characteristics of the data entries 120 and previous queries 302, the thresholding module 304 may determine a first efficiency value indicative of the time or resources that may be used to determine correspondence between a query and the data entries 102, and a second efficiency value indicative of the time or resources that may be used to determine correspondence between the query and the previous queries 302. The efficiency values may include a length of time that may be used to process a query, a quantity of computing resources, such as processor cycles, that may be used to process the query, a quantity of external resources, such as electrical power, that may be used to process the query, and so forth. The manner in which the efficiency values are calculated may be determined based on one or more rules or algorithms indicated by threshold data 308. Based on the quantity and characteristics of the data entries 120 and previous queries 302, the thresholding module 304 may generate a thresholding determination 306 indicating whether a query is first analyzed by determining correspondence between the query and the data entries 120, or by determining correspondence between the query and the previous queries 302. The thresholding data 308 may include data indicative of relationships between the previous queries 302 and data entries 120 or between the first and second efficiency values that may determine whether initially analyzing a query using the data entries 120 or the previous queries 302 would consume less time or resources.

Other modules 726 may also be present in the memory 718. For example, encryption modules may be used to encrypt and decrypt communications between computing devices 702. User account modules may be configured to receive and process user data 204. Administrator modules may be used to modify default settings and preferences. Machine learning modules may be configured to determine relationships between queries and data entries 120 and between query parameters and language data 112. User interface modules may be used to provide user interfaces that may receive queries, user data 204, feedback data, and so forth. Feedback modules may receive feedback data and determine correspondence between the feedback data and threshold feedback value, which may in turn determine whether a received query 102 is stored as additional query data 126.

Other data 728 within the data store 722 may include default configurations and settings associated with computing devices 702. Other data 728 may also include security data, such as encryption keys and schema, access credentials, and so forth. Other data 728 may further include user interface content and formats, algorithms used to process and analyze feedback data, and so forth.

In different implementations, different computing devices 702 may have different capabilities or capacities. For example, query servers 108 may have significantly more processor 706 capability and memory 718 capacity compared to the processor 706 capability and memory 718 capacity of user devices 106.

Figure 8:
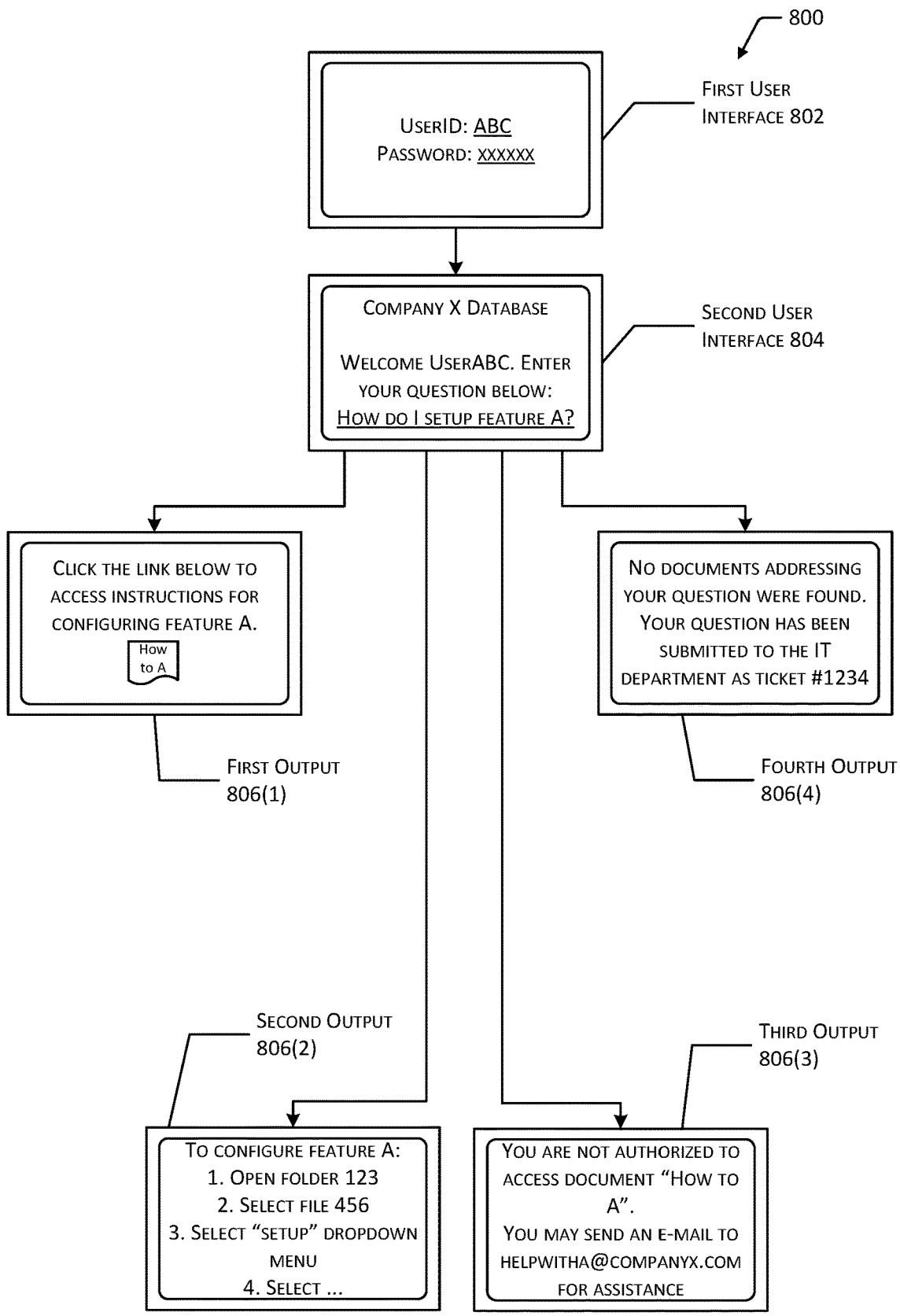
FIG. 8 depicts a series of block diagrams illustrating one or more user interfaces that may be provided to a user device.

FIG. 8 depicts a series of block diagrams 800 illustrating one or more user interfaces that may be provided to a user device 106. For example, a first user interface 802 may be used to receive user data 204 from a user. Continuing the example, the first user interface 802 may request a user identifier, such as an account name, a password, or other information indicative of a user, a user device 106, a company of the user, a location of the user, and so forth. In other implementations, user data 204 may be determined based on an IP address or other information that may be determined from the user device 106 without soliciting user input from the user. Based on the user data 204, a particular source of data entries 120 associated with a particular company may be determined.

A second user interface 804 may be provided to the user device 106 to request input of a query. For example, an employee of a company may input a query regarding how to setup a particular feature of the user device 106. The particular output 806 provided to the user device 106 may depend on one or more of the user data 204, security data 206, or response data 130. For example, a first output 806(1) that includes a link used to access a data entry 120 and an instruction to access the link may be provided to the user device 106 if the response data 130 indicates that a response 104 associated with a particular responsive data entry 124 is to include a link for accessing the responsive data entry 124. A second output 806(2) that includes alphanumeric data indicative of the content of the responsive data entry 124 may be provided to the user device 106 if the response data 130 indicates that a response 104 should include the content of the responsive data entry 124.

A third output 806(3) may be provided to the user device 106 if the user data 204 determined from the user device 106 does not correspond to security data 206, which may indicate that the user device 106 or associated user account is not authorized to access a particular data entry 120 or source of data entries 120. In such a case the third output 806(3) may indicate a lack of authorization to access one or more data entries 120 and instructions regarding contacting an individual that may be able to assist with resolution of the query.

A fourth output 806(4) may be provided to the user device 106 if no data entry 120 or previous query 302 corresponds to the received query 102, or an augmented query 114 based on the received query 102. For example, if a correspondence value for each data entry 120 or previous query 302 is less than a threshold correspondence value, this may indicate that none of the existing data entries 120 are relevant to the received query 102. In such a case, correspondence may be determined between the parameters of the received query 102 and group data, which may indicate particular parameters or types of queries that are addressed by a particular individual or group. Based on correspondence between the received query 102 and the group data, a particular recipient for the query may be determined. The fourth output 806(4) may indicate the particular individual or group, such as a department of a company, that has received the query. In some implementations, the fourth output 806(4) may also indicate a method of tracking the query, such as a ticket number. In some cases, a response 104 provided by a particular individual or group may be converted into a data entry 120 that may be stored in association with the corresponding received query 102. A response 104 to subsequent queries that have parameters similar to the received query 102 may include at least a portion of the stored data entry 120.

Figure 9:
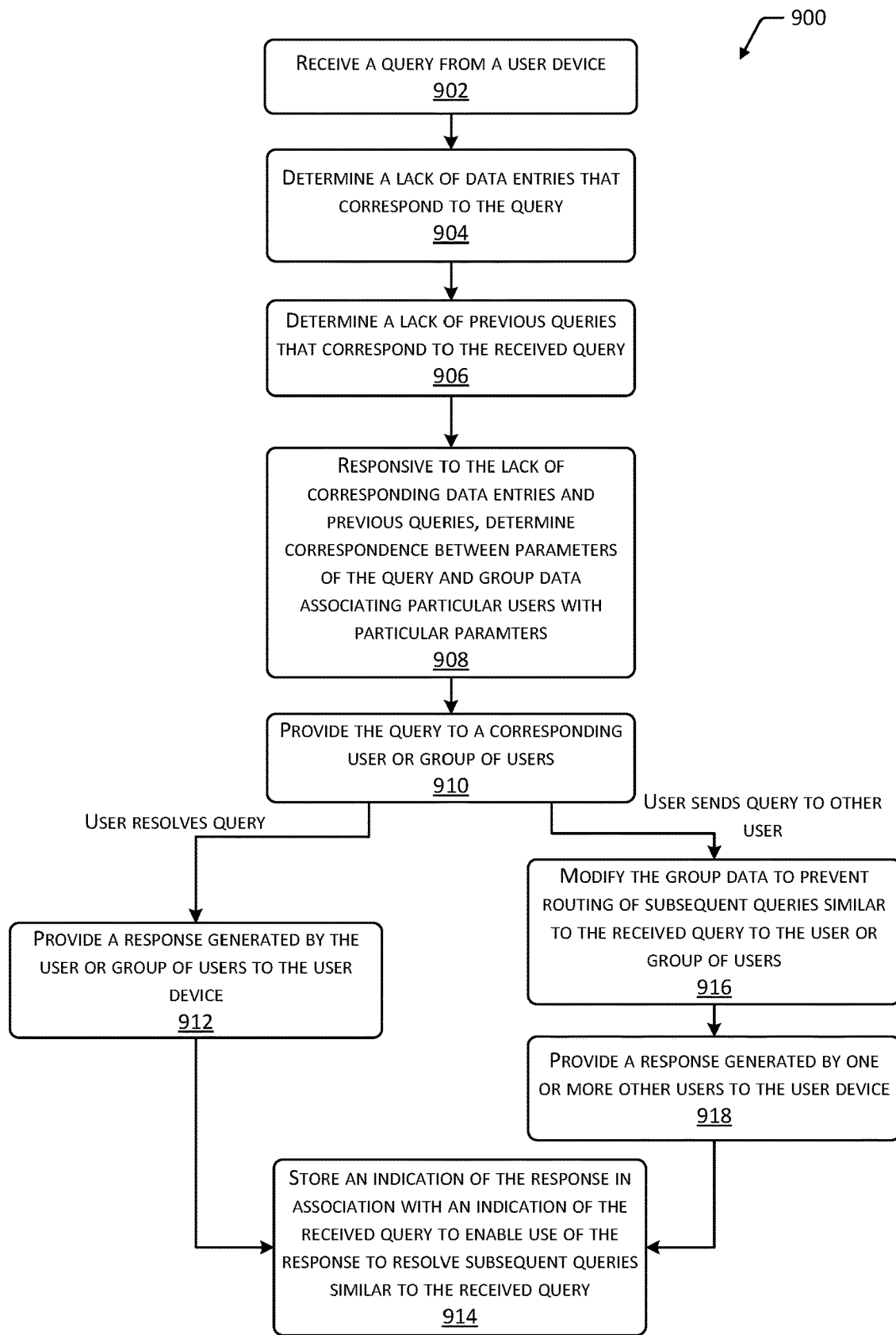
FIG. 9 is a flow diagram illustrating a method for providing a query to one or more human users.

FIG. 9 is a flow diagram 900 illustrating a method for providing a query to one or more human users. Block 902 receives a query from a user device 106. The received query 102 may include various parameters, such as keywords, groups of words, arrangements of words, formats of words or letters, punctuation, and so forth.

Block 904 determines a lack of data entries 120 that correspond to the query. For example, in some cases, for a particular received query 102, no existing data entry 120 may include parameters that correspond to those of the received query 102 within a threshold level of confidence. Block 906 determines a lack of previous queries 302 that correspond to the received query 102. Continuing the example, in some cases, for a particular received query 102, no existing previous query 302 may include parameters that correspond to those of the received query 102 within a threshold level of confidence.

Responsive to the lack of corresponding data entries 120 and previous queries 302, block 908 determines correspondence between the parameters of the query and group data that associates particular users (or groups of users) with particular parameters. For example, the group data may indicate a particular e-mail address to which particular queries may be sent if the queries include certain keywords. In some implementations, if no user or group of users indicated in the group data corresponds with the parameters of the received query 102, the query may be provided to a default destination, such as an e-mail address associated with users that resolve queries of a general nature or route queries to other users. Block 910 provides the query to a corresponding user or group of users. For example, the group data may indicate one or more e-mail addresses, telephone numbers, or addresses associated with other messaging or communication services. The query may be provided to the one or more users in a manner indicated in the group data.

If the user(s) that receive the query resolve the query, such as by preparing a response 104, block 912 provides the response 104 generated by the user or group of users to the user device 106. In some cases, the response 104 may include a data entry 120 generated by the user or group of users, the data entry 120 including information responsive to the received query 102. Block 914 may store an indication of the response 104 in association with an indication of the received query 102, to enable the response 104 to be used to resolve subsequent queries similar to the received query 102. For example, if a subsequent query having similar parameters is received, a data entry 120 generated by the user(s) may be used to form the response 104 in place of or in addition to providing the query to the corresponding group of users.

In some cases, the user(s) that receive a query may send the query to one or more other users rather than generating a response 104. For example, a particular group of users may be responsible for routing queries that do not correspond to the group data to suitable users for resolution. As another example, a particular query may include parameters that correspond to a particular group of users, but that group of users may be unsuitable for providing a response 104. Continuing the example, the query, "Is it against company policy to configure a co-worker's computer to send faxes" may correspond to group data indicative of a company's IT department due to the terms "configure", "computer", and "faxes". However, a query associated with company policy may be better addressed by the company's HR department. Block 916 may modify the group data to prevent routing of subsequent queries similar to the received query 102 to the user or group of users. For example, the group data may be modified such that subsequent queries having the term "company policy" are not to be provided to the IT department, independent of whether the queries include the terms "computer" and "configure".

Block 918 may provide a response 104 generated by one or more other users, to the user device 106. In some cases, the response 104 may be generated by one or more users other than the user(s) that initially received the query. For example, the user(s) that initially receive the query may provide the query to another user or group of users rather than generating a response 104. Responses 104 generated by the other users may similarly be stored in association with an indication of the query to enable the response(s) 104 to be used to resolve subsequent queries that are similar to the received query 102, as indicated in block 914.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
receiving a first query including one or more query parameters;
determining a source associated with the first query;
determining correspondence between the source associated with the first query and security data, wherein the security data associates the source with a plurality of data entries;
determining that a first quantity of computing resources associated with analyzing the plurality of data entries is less than a second quantity of computing resources associated with analyzing a plurality of previous queries;
determining first correspondence values based on correspondence between the one or more query parameters and the plurality of data entries;
based on the first correspondence values, determining at least a subset of the plurality of data entries that correspond to the first query;
determining, based on query data that associates one or more of the plurality of previous queries with respective data entries of the plurality of data entries, at least a subset of the plurality of previous queries that correspond to the at least a subset of the plurality of data entries;

determining second correspondence values based on correspondence between the first query and the at least a subset of the plurality of previous queries, wherein the determining of the second correspondence values is performed subsequent to the determining of the first correspondence values based on the first quantity being less than the second quantity;

based on the first correspondence values and the second correspondence values, determining respective aggregate correspondence values for the at least a subset of the plurality of data entries;

determining a particular data entry associated with a greatest aggregate correspondence value of the respective aggregate correspondence values; and generating a response indicative of the particular data entry.

2. The method of claim 1, further comprising:

accessing language data indicative of one or more of weights or synonyms associated with at least a subset of the one or more query parameters; and modifying the one or more query parameters by one or more of:

removing at least one query parameter from the one or more query parameters based on correspondence between the one or more query parameters and the language data, wherein the correspondence between the one or more query parameters and the language data indicates that a weight of the at least one query parameter is less than a threshold weight; or adding at least one query parameter to the one or more query parameters based on the correspondence between the one or more query parameters and the language data indicating at least one synonym corresponding to the at least one query parameter.

3. The method of claim 1, further comprising:

generating a request for feedback data associated with the response;

receiving the feedback data responsive to the request;

determining correspondence between the feedback data and one or more threshold feedback values; and based on the correspondence between the feedback data and the one or more threshold feedback values, performing one or more of:

generating a notification associated with the first query; or storing data indicative of the first query in association with data indicative of the particular data entry as additional query data.

4. The method of claim 1, wherein the determining of the at least a subset of the plurality of data entries includes:

accessing threshold count data indicative of a maximum count of data entries to be accessed responsive to the first query; and determining that a count of data entries associated with the at least a subset of the plurality of data entries is less than or equal to the maximum count of data entries.

5. The method of claim 1, wherein the security data further indicates one or more sources of queries that are authorized to access respective data entries, the method further comprising:

determining, based on the correspondence between the source associated with the first query and the security data, that the source associated with the first query is not authorized to access the particular data entry; and generating one or more of:

a first notification to the source of the first query, the first notification including information for obtaining human intervention to respond to the first query; or a second notification to a user associated with the particular data entry indicating an unauthorized attempt to access the particular data entry.

6. The method of claim 1, further comprising:

determining, based on the correspondence between the source associated with the first query and the security data, a particular source of data entries that corresponds to the source of the first query, wherein the particular data entry is associated with the particular source of data entries.

7. A system comprising:

one or more memories storing computer-executable instructions; and one or more hardware processors to execute the computer-executable instructions to:

receive a first query including one or more query parameters;

determine one or more of:

a first count of a plurality of previous queries is less than a second count of data entries included in a plurality of data entries; or a first quantity of computing resources associated with analyzing the plurality of previous queries is less than a second quantity of computing resources to determine correspondence between the one or more query parameters and data entries stored in a source that includes the plurality of data entries;

determine first correspondence values based on correspondence between the one or more query parameters and data indicative of the plurality of previous queries;

determine a subset of the plurality of data entries that are associated with the plurality of previous queries;

in response to one or more of the first count or the first quantity of computing resources, subsequent to determining the first correspondence values, determine second correspondence values based on correspondence between the one or more query parameters and the plurality of data entries;

based on the first correspondence values and the second correspondence values, determine aggregate correspondence values for at least a subset of the plurality of data entries;

determine a first data entry of the subset of the plurality of data entries that is associated with a greatest aggregate correspondence value of the aggregate correspondence values; and generate a response that indicates the first data entry.

8. The system of claim 7, further comprising computer-executable instructions to:

determine a source associated with the first query; and determine a source of data entries based on correspondence between the source associated with the first query and data that associates sources of queries with sources of data entries, wherein the source of data entries includes the plurality of data entries.

9. The system of claim 7, further comprising computer-executable instructions to:

determine a source associated with the first query;

determine correspondence between the source and data indicating sources of queries that are authorized to access particular data entries; and determine, based on the correspondence between the source and the data indicating the sources of queries that are authorized to access the particular data entries, that the source is authorized to access one or more of the the plurality of data entries, the first data entry, or the data indicative of the plurality of previous queries.

10. The system of claim 7, further comprising computer-executable instructions to:
determine correspondence between the one or more query parameters and language data that indicates one or more of weights or synonyms associated with at least a subset of the one or more query parameters;
based on the correspondence between the one or more query parameters and the language data, modify the one or more query parameters by one or more of:
removing at least one query parameter from the one or more query parameters based on the correspondence between the one or more query parameters and the language data indicating that a weight of the at least one query parameter is less than a threshold weight; or
adding at least one query parameter to the one or more query parameters based on the correspondence between the one or more query parameters and the language data indicating at least one synonym that corresponds to the at least a subset of the one or more query parameters.

11. The system of claim 7,
wherein the first correspondence values are determined prior to determining the second correspondence values in response to the first count being less than the second count.

12. The system of claim 7,
wherein the first correspondence values are determined prior to determining the second correspondence values in response to the first quantity being less than the second quantity.

13. The system of claim 7, further comprising computer-executable instructions to:
receive feedback data associated with the response;
determine correspondence between the feedback data and one or more threshold feedback values; and
based on the correspondence between the feedback data and the one or more threshold feedback values, generate additional data indicative of previous queries by storing data indicative of the first query in association with data indicative of the first data entry.

14. A system comprising:
one or more memories storing computer-executable instructions; and
one or more hardware processors to execute the computer-executable instructions to:
receive a first query including one or more query parameters;
determine one or more of:
a first count of a plurality of data entries is less than a second count of previous queries; or
a first quantity of computing resources to determine correspondence between the one or more query parameters and the plurality of data entries is less than a second quantity of computing resources to determine correspondence between the one or more query parameters and the previous queries;
determine first correspondence values based on correspondence between the one or more query parameters and the plurality of data entries;
based on the first correspondence values, determine at least a subset of the plurality of data entries that correspond to the first query;
determine, based on query data that associates the previous queries with data entries, at least a subset of the previous queries that correspond to the at least a subset of the plurality of data entries;
in response to one or more of the first count or the first quantity, subsequent to determining the first correspondence values, determine second correspondence values based on correspondence between the first query and the at least a subset of the previous queries;
based on the first correspondence values and the second correspondence values, determine aggregate correspondence values for the at least a subset of the plurality of data entries;
determine a first data entry of the plurality of data entries that is associated with a greatest aggregate correspondence value of the aggregate correspondence values; and
generate a first response that indicates the first data entry.

15. The system of claim 14, further comprising computer-executable instructions to:
determine a source associated with the first query; and
determine a source of data entries based on correspondence between the source associated with the first query and data that associates sources of queries with sources of data entries, wherein the source of data entries includes the plurality of data entries.

16. The system of claim 14,
wherein the first correspondence values are determined prior to determining the second correspondence values in response to the first count being less than the second count.

17. The system of claim 14,
wherein the first correspondence values are determined prior to determining the second correspondence values in response to the first quantity being less than the second quantity.

18. The system of claim 14, further comprising computer-executable instructions to:
receive feedback data associated with the first response;
determine that the feedback data deviates from one or more threshold feedback values;
determine correspondence between the one or more query parameters and group data indicative of parameters of previous queries associated with respective groups;
based on the correspondence between the one or more query parameters and the group data, determine a group for receipt of the first query;
provide a notification to one or more user devices associated with the group, wherein the notification includes data indicative of the first query; and
receive a second response from the one or more user devices.

19. The system of claim 14, further comprising computer-executable instructions to:
receive feedback data associated with the first response;
determine that the feedback data corresponds to one or more threshold feedback values; and
based on the correspondence between the feedback data and the one or more threshold feedback values, generate additional query data by storing data indicative of the first query in association with data indicative of the first data entry.

20. The system of claim 14, further comprising computer-executable instructions to:
    determine a threshold correspondence value that is associated with a selected count of data entries, wherein determining the at least a subset of the plurality of data entries includes determining that the first correspondence values for the at least a subset of the plurality of data entries are greater than the threshold correspondence value, and wherein a count of the at least a subset of the plurality of data entries is less than or equal to the selected count of data entries.

* * * * *

UNITED STATES PATENT AND TRADEMARK OFFICE
CERTIFICATE OF CORRECTION

PATENT NO. : 10,685,047 B1  
APPLICATION NO. : 15/373312  
DATED : June 16, 2020  
INVENTOR(S) : Pratyus Patnaik et al.

Page 1 of 1

It is certified that error appears in the above-identified patent and that said Letters Patent is hereby corrected as shown below:

In the Claims

Column 33, Claim 9, Line 5:  
Currently reads: "the the plurality of data entries"  
Where it should read: --the plurality of data entries--.

Signed and Sealed this  
Fourth Day of August, 2020

Andrei Iancu  
*Director of the United States Patent and Trademark Office*